US008064392B2

(12) United States Patent
Chang et al.

(10) Patent No.: US 8,064,392 B2
(45) Date of Patent: Nov. 22, 2011

(54) METHOD FOR DYNAMIC RESOURCE ALLOCATION OF UPLINK AND DOWNLINK IN OFDMA/TDD CELLULAR SYSTEM

(75) Inventors: Kyung Hi Chang, Seoul (KR); Sang Jun Ko, Seoul (KR); Tae Hyoung Sun, Gwangju (KR); Jae Hyeong Kim, Seoul (KR)

(73) Assignee: Inha Industry Partnership Institute, Incheon (KR)

( * ) Notice: Subject to any disclaimer, the term of this patent is extended or adjusted under 35 U.S.C. 154(b) by 1094 days.

(21) Appl. No.: 11/859,287

(22) Filed: Sep. 21, 2007

(65) Prior Publication Data

US 2008/0076438 A1 Mar. 27, 2008

(30) Foreign Application Priority Data

Sep. 26, 2006 (KR) .................. 10-2006-0093546

(51) Int. Cl.
*H04B 7/00* (2006.01)
(52) U.S. Cl. ........ 370/329; 370/310; 370/328; 370/330; 455/450; 455/452.1; 455/453
(58) Field of Classification Search .................. 370/310, 370/328, 329
See application file for complete search history.

(56) References Cited

U.S. PATENT DOCUMENTS

| | | | | |
|---|---|---|---|---|
| 2003/0137950 | A1* | 7/2003 | Kim et al. ........... | 370/318 |
| 2004/0048630 | A1* | 3/2004 | Shapira ............ | 455/509 |
| 2004/0120347 | A1* | 6/2004 | Lee et al. ........... | 370/468 |
| 2004/0190484 | A1* | 9/2004 | Shin et al. .......... | 370/347 |
| 2005/0085235 | A1* | 4/2005 | Park et al. ......... | 455/450 |
| 2005/0105589 | A1* | 5/2005 | Sung et al. ........ | 375/130 |
| 2009/0196362 | A1* | 8/2009 | Song et al. ........ | 375/260 |
| 2011/0003605 | A1* | 1/2011 | Song et al. ........ | 455/501 |

OTHER PUBLICATIONS

Kivanc et al, Computationally Efficient Bandwidth Allocation and Power Control for OFDMA, Nov. 2003, IEEE Transactions On Wireless Communications, vol. 2, No. 6.*
Ko et al, Capacity Optimization of 802.163 OFDMA/TDD Cellular System using the Joint Allocation of Sub-channel and Transmit Power, Feb. 2007, Advanced Communication Technology.*

* cited by examiner

*Primary Examiner* — Hassan Phillips
*Assistant Examiner* — Gautam Sharma
(74) *Attorney, Agent, or Firm* — LRK Patent Law Firm

(57) ABSTRACT

Provided is a method for dynamic resource allocation of uplink and downlink in an OFDMA/TDD cellular system. The method for dynamic resource allocation of uplink in an OFDMA/TDD cellular system includes the steps of determining the number of sub-channels which can be allocated to each user through an FLR algorithm; performing channel allocation for a first frame through a round-robin algorithm in which channel information is not needed; performing dynamic channel allocation for a next frame through uplink channel information measured by uplink channel sounding; and performing power control. The method for dynamic resource allocation of downlink in an OFDMA/TDD cellular system includes the steps of selecting a user through a GPF algorithm; performing dynamic channel allocation through an ASA algorithm so as to perform a FASA algorithm for obtaining a multiuser diversity gain; and performing dynamic power allocation through an improved CHC algorithm, in consideration of a data rate provided to each user and a channel state.

7 Claims, 27 Drawing Sheets

[FIG. 2]
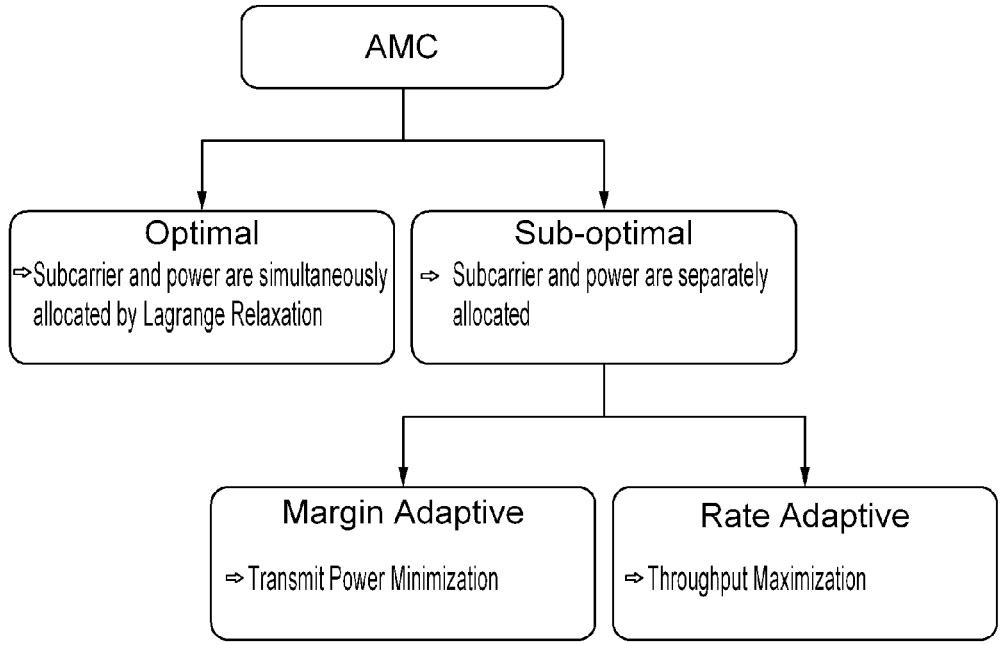
[FIG. 3]
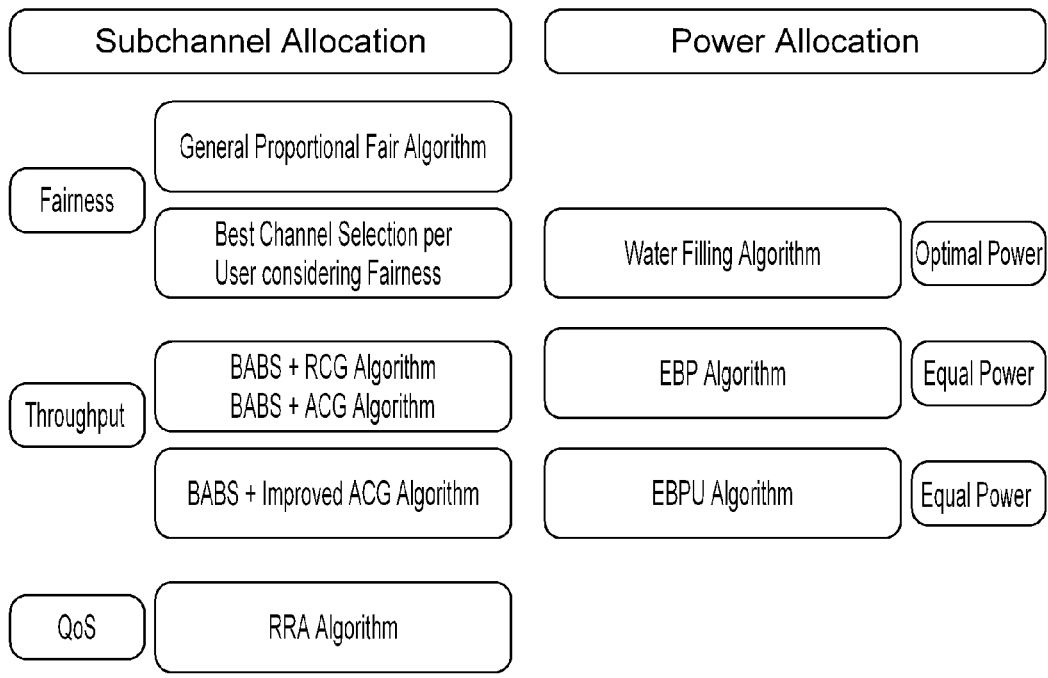

[FIG. 4]

$$m_k \leftarrow \left\lceil \frac{R_{k,req}}{R_k} \right\rceil, \quad k = 0, \ldots, K-1$$

while $\sum_{k=0}^{K-1} m_k > M$, do $$k^* \leftarrow \arg\min_{0 \leq k \leq K-1} m_k$$

$$m_{k^*} \leftarrow 0$$

end while while $\sum_{k=0}^{K-1} m_k < M$, do $$G_k \leftarrow \frac{m_k + 1}{H_k} f\left(\frac{R^k_{min}}{m_k + 1}\right), \quad k = 0, \ldots, K-1$$

$$l \leftarrow \arg\min_{0 \leq k \leq K-1} G_k$$

$$m_l \leftarrow m_l + 1$$

end while

[FIG. 5]

Ensure : $m_k$ is the number of subcarriers allocated to each user, $r_k(n)$ is the estimated transmission rate of user $k$ on subcarrier $n$ for each subcarrier $n = 0 : N-1$, do
$$k^* \leftarrow \arg\max_{0 \leq k \leq K-1} r_k(n)$$
$$C_{k^*} \leftarrow C_{k^*} \cup \{n\}$$
end for for all users k such that $\#C_k > m_k$ do
  while $\#C_k > m_k$ do
  $$l^* \leftarrow \arg\min_{(l:\#C_l < m_l)} \min_{0 \leq n \leq N-1} -r_k(n) + r_l(n)$$
  $$n^* \leftarrow \arg\min_{0 \leq n \leq N-1} -r_k(n) + r_l(n)$$
  $$C_k \leftarrow C_k \setminus \{n^*\}, C_{l^*} \leftarrow C_{l^*} \cup \{n^*\}$$
  end while
end for

[FIG. 6]

User

| | #1 | #2 | #3 | #4 |
|---|---|---|---|---|
| #1 | ✗ | 1 | 2 | ③ |
| #2 | ✗ | ⑥ | 3 | 5 |
| #3 | ⑥ | 2 | 4 | 1 |
| #4 | 5 | ⑨ | 1 | 8 |
| #5 | 3 | 4 | ⑥ | 2 |
| #6 | ⑧ | 7 | 8 | 6 |
| #7 | 2 | 3 | ⑤ | 4 |
| #8 | 1 | 5 | ✗ | ⑦ |

Sub-channel

FIG. 7

User 1
Acquired Datarate/Required Datarate=100/400

| SC1 | SC2 | SC3 | SC4 | SC5 | SC6 | SC7 |
|-----|-----|-----|-----|-----|-----|-----|
| 2   | 1   | 4   | 3   | 5   | 6   | 2   |

User 2
Acquired Datarate/Required Datarate=200/400

| SC1 | SC2 | SC3 | SC4 | SC5 | SC6 | SC7 |
|-----|-----|-----|-----|-----|-----|-----|
| 2   | 3   | 1   | 5   | 7   | 3   | 2   |

User 3
Acquired Datarate/Required Datarate=150/400

| SC1 | SC2 | SC3 | SC4 | SC5 | SC6 | SC7 |
|-----|-----|-----|-----|-----|-----|-----|
| 5   | 4   | 6   | 2   | 8   | 5   | 3   |

User 4
Acquired Datarate/Required Datarate=300/400

| SC1 | SC2 | SC3 | SC4 | SC5 | SC6 | SC7 |
|-----|-----|-----|-----|-----|-----|-----|
| 4   | 5   | 2   | 7   | 1   | 3   | 2   |

Smallest

User 1 : $\frac{M_{Acquired}}{M_{Required}} = \frac{100}{400}$

User 2 : $\frac{M_{Acquired}}{M_{Required}} = \frac{200}{400}$

User 3 : $\frac{M_{Acquired}}{M_{Required}} = \frac{150}{400}$

User 4 : $\frac{M_{Acquired}}{M_{Required}} = \frac{300}{400}$

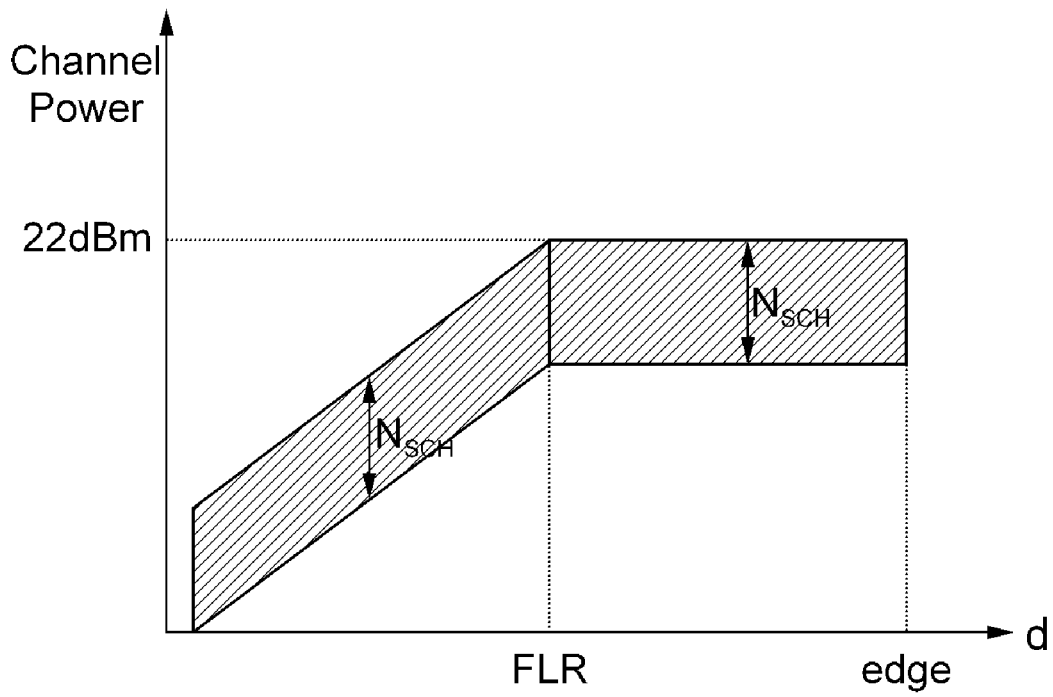
[FIG. 9A]
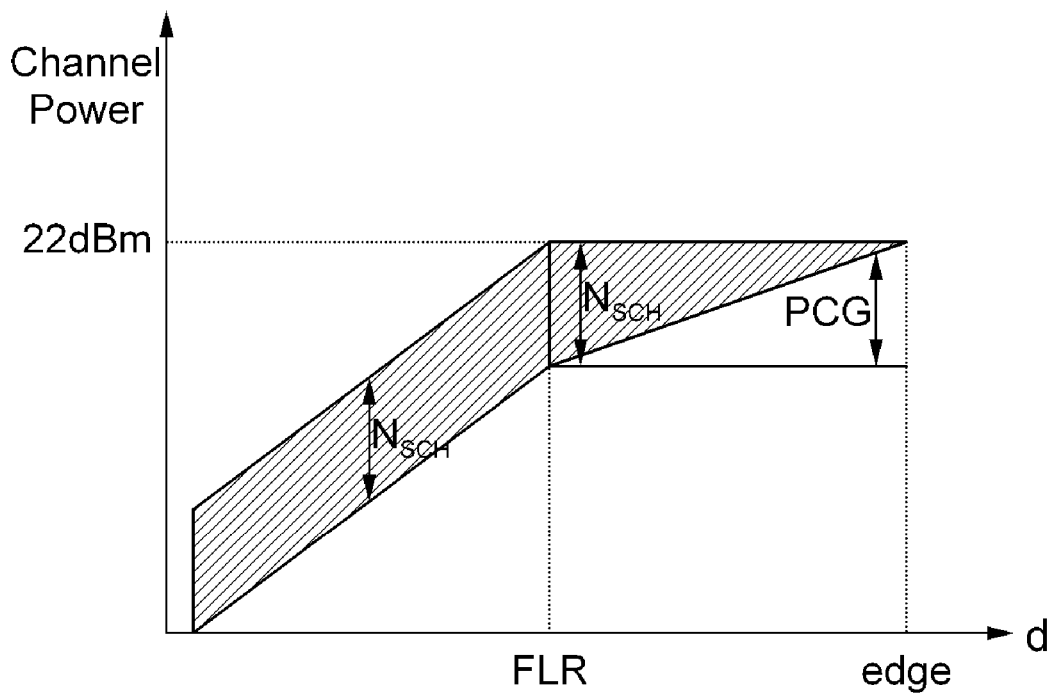
[FIG. 9B]

[FIG. 10]
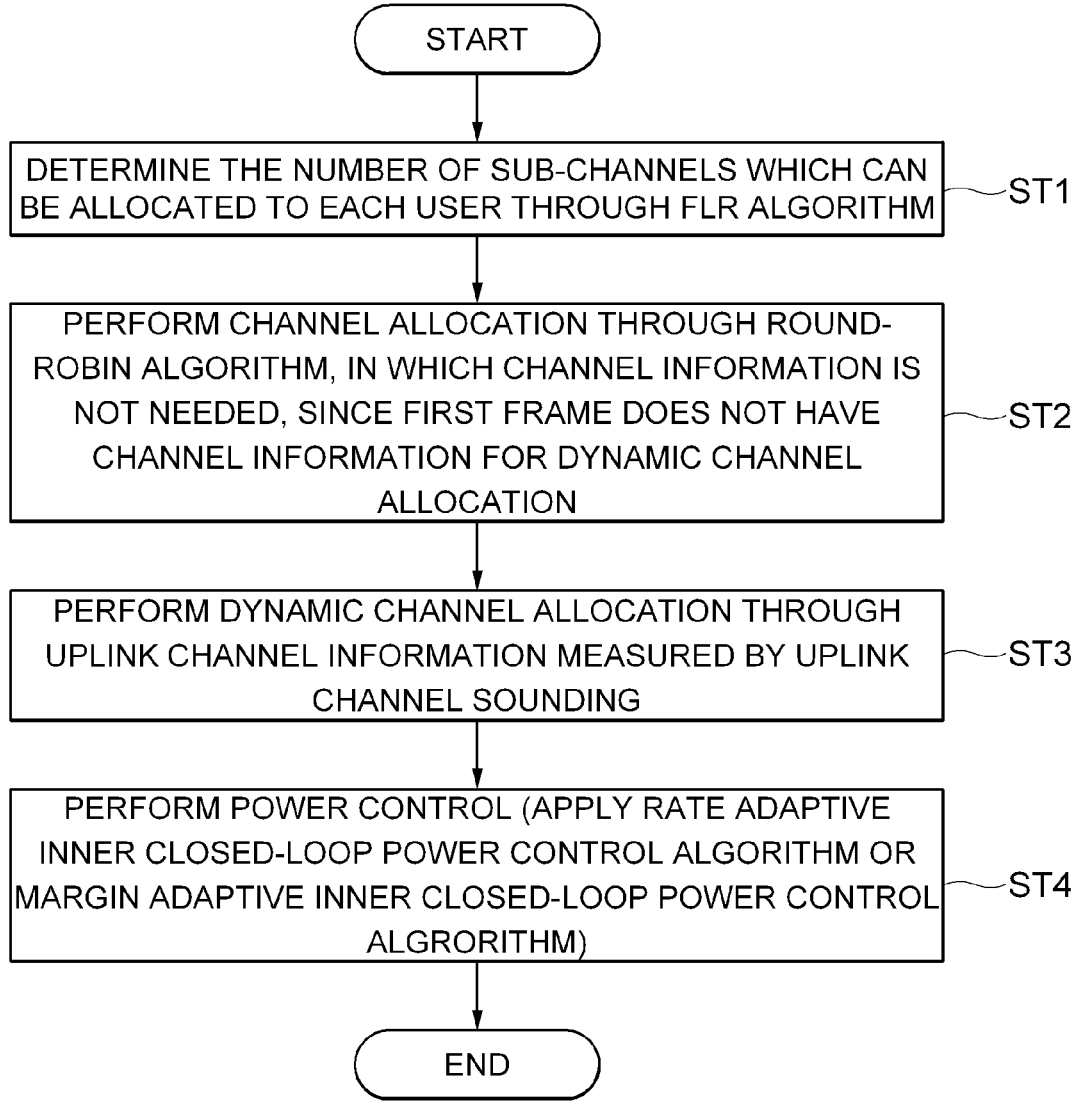

FIG. 13

0xdbc5, 0xda3b, 0x243b, 0xda3b, 0xdbc5, 0x25c5, 0xdbc5, 0xda3b, 0x243b, 0xda3b, 0xdbc5, 0x25c5, 0xdbc5, 0xda3b,
0x25c5, 0xdbc5, 0x25c5, 0xdbc5, 0xda3b, 0x243b, 0xda3b, 0xdbc5, 0x25c5, 0xdbc5, 0x25c5, 0xdbc5, 0xda3b, 0x243b,
0x243b, 0x25c5, 0x243b, 0x25c5, 0xdbc5, 0xda3b, 0xdbc5, 0x25c5, 0x243b, 0x25c5, 0x243b, 0x25c5, 0xdbc5, 0xda3b,
0xda3b, 0xdbc5, 0xda3b, 0xdbc5, 0x25c5, 0x243b, 0x25c5, 0xdbc5, 0xda3b, 0xdbc5, 0xda3b, 0xdbc5, 0x25c5, 0x243b,
0xdbc5, 0x25c5, 0xdbc5, 0x25c5, 0x243b, 0xda3b, 0x243b, 0x25c5, 0xdbc5, 0x25c5, 0xdbc5, 0x25c5, 0x243b, 0xda3b,
0x25c5, 0x243b, 0x25c5, 0x243b, 0xda3b, 0xdbc5, 0xda3b, 0x243b, 0x25c5, 0x243b, 0x25c5, 0x243b, 0xda3b, 0xdbc5,
0x243b, 0xda3b, 0x243b, 0xda3b, 0xdbc5, 0x25c5, 0xdbc5, 0xda3b, 0x243b, 0xda3b, 0x243b, 0xda3b, 0xdbc5, 0x25c5,
0xda3b, 0xdbc5, 0xda3b, 0xdbc5, 0x25c5, 0x243b, 0x25c5, 0xdbc5, 0xda3b, 0xdbc5, 0xda3b, 0xdbc5, 0x25c5, 0x243b,
0xdbc5, 0x25c5, 0xdbc5, 0x25c5, 0x243b, 0xda3b, 0x243b, 0x25c5, 0xdbc5, 0x25c5, 0xdbc5, 0x25c5, 0x243b, 0xda3b,
0x25c5, 0x243b, 0x25c5, 0x243b, 0xda3b, 0xdbc5, 0xda3b, 0x243b, 0x25c5, 0x243b, 0x25c5, 0x243b, 0xda3b, 0xdbc5,
0x243b, 0xda3b, 0x243b, 0xda3b, 0xdbc5, 0x25c5, 0xdbc5, 0xda3b, 0x243b, 0xda3b, 0x243b, 0xda3b, 0xdbc5, 0x25c5,
0xda3b, 0xdbc5, 0xda3b, 0xdbc5, 0x25c5, 0x243b, 0x25c5, 0xdbc5, 0xda3b, 0xdbc5, 0xda3b, 0xdbc5, 0x25c5, 0x243b,
0xdbc5, 0x25c5, 0xdbc5, 0x25c5, 0x243b, 0xda3b, 0x243b, 0x25c5, 0xdbc5, 0x25c5, 0xdbc5, 0x25c5, 0x243b, 0xda3b,
0x25c5, 0x243b, 0x25c5, 0x243b, 0xda3b, 0xdbc5, 0xda3b, 0x243b, 0x25c5, 0x243b, 0x25c5, 0x243b, 0xda3b, 0xdbc5,
0x243b, 0xda3b, 0x243b, 0xda3b, 0xdbc5, 0x25c5, 0xdbc5, 0xda3b, 0x243b, 0xda3b, 0x243b, 0xda3b, 0xdbc5, 0x25c5,
0xda3b, 0xdbc5, 0xda3b, 0xdbc5, 0x25c5, 0x243b, 0x25c5, 0xdbc5, 0xda3b, 0xdbc5, 0xda3b, 0xdbc5, 0x25c5, 0x243b,
0x25c5, 0x243b, 0xda3b, 0xdbc5, 0xda3b, 0x243b, 0xda3b

FIG. 14

| Length | Offset | Length | Offset | Length | Offset | Length | Offset | Length | Offset | Length | Offset |
|---|---|---|---|---|---|---|---|---|---|---|---|
| 18 | 44 | 306 | 1512 | 594 | 264 | 882 | 1426 | 1170 | 961 | 1458 | 352 |
| 36 | 119 | 324 | 446 | 612 | 767 | 900 | 639 | 1188 | 542 | 1476 | 369 |
| 54 | 140 | 342 | 424 | 630 | 423 | 918 | 314 | 1206 | 1727 | 1494 | 354 |
| 72 | 3 | 360 | 1502 | 648 | 1667 | 936 | 313 | 1224 | 1720 | 1512 | 342 |
| 90 | 376 | 378 | 340 | 666 | 1171 | 954 | 561 | 1242 | 1541 | 1530 | 1350 |
| 108 | 478 | 396 | 799 | 684 | 1154 | 972 | 1170 | 1260 | 1537 | 1548 | 1343 |
| 126 | 32 | 414 | 1473 | 702 | 1153 | 990 | 1557 | 1278 | 384 | 1566 | 1344 |
| 144 | 478 | 432 | 96 | 720 | 1151 | 1008 | 1295 | 1296 | 882 | 1584 | 1347 |
| 162 | 102 | 450 | 28 | 738 | 1135 | 1026 | 509 | 1314 | 800 | 1602 | 1342 |
| 180 | 191 | 468 | 1423 | 756 | 682 | 1044 | 377 | 1332 | 442 | 1620 | 1322 |
| 198 | 744 | 486 | 587 | 774 | 671 | 1062 | 1264 | 1350 | 407 | 1638 | 1300 |
| 216 | 764 | 504 | 519 | 792 | 671 | 1080 | 1270 | 1368 | 406 | 1656 | 1289 |
| 234 | 98 | 522 | 1536 | 810 | 641 | 1098 | 1183 | 1386 | 410 | 1674 | 1277 |
| 252 | 324 | 540 | 187 | 828 | 640 | 1116 | 164 | 1404 | 387 | 1692 | 1279 |
| 270 | 505 | 558 | 1510 | 846 | 639 | 1134 | 959 | 1422 | 376 | 1710 | 1261 |
| 288 | 16 | 576 | 736 | 864 | 1407 | 1152 | 1537 | 1440 | 367 | 1728 | 1600 |

[FIG. 15]
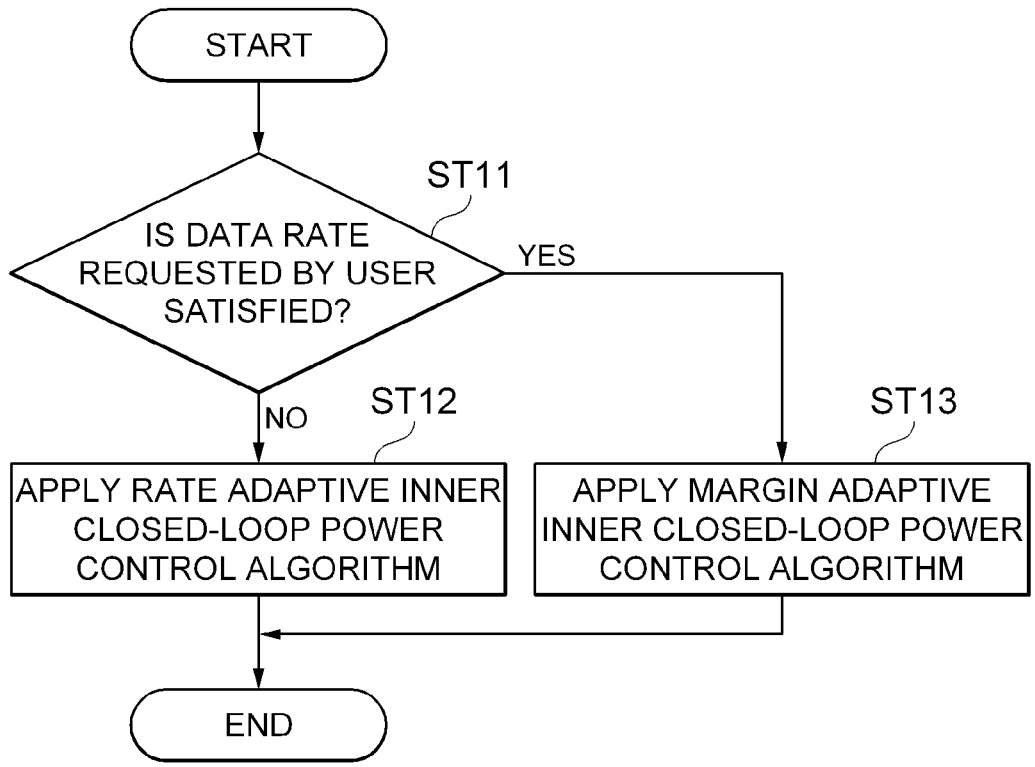
[FIG. 16]
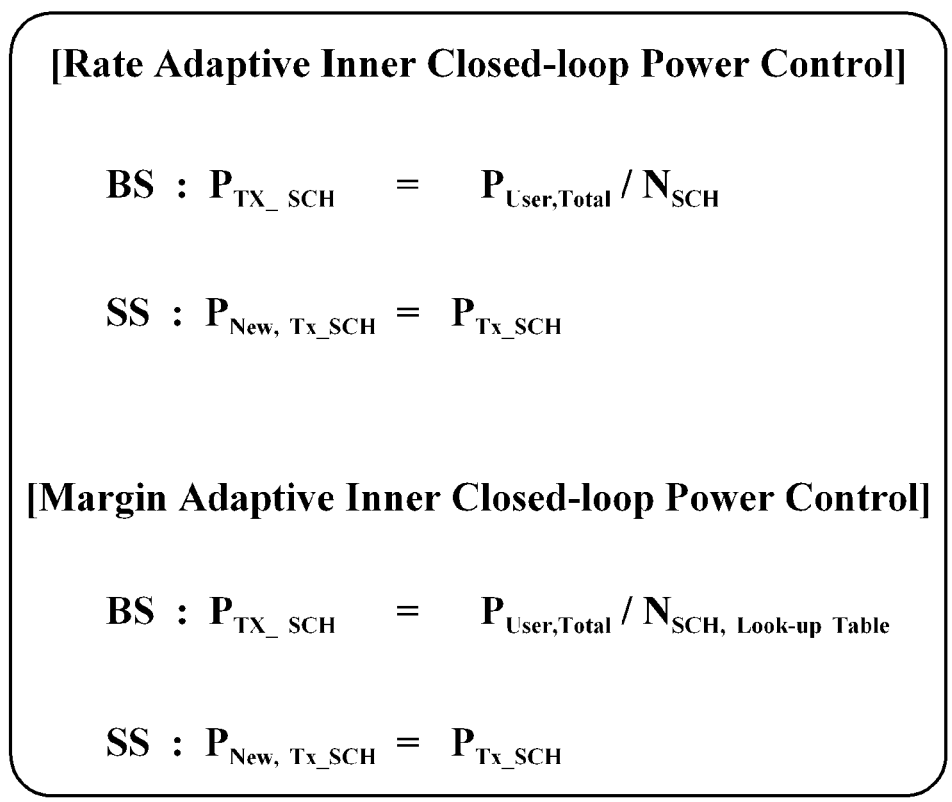

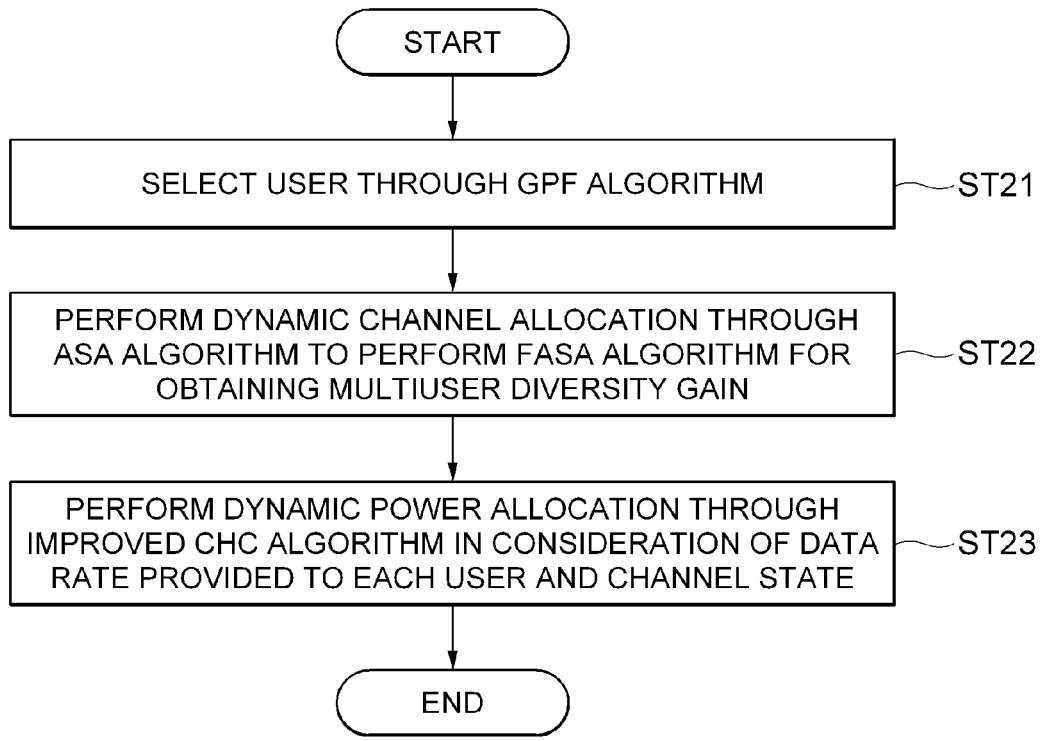
[FIG. 17]

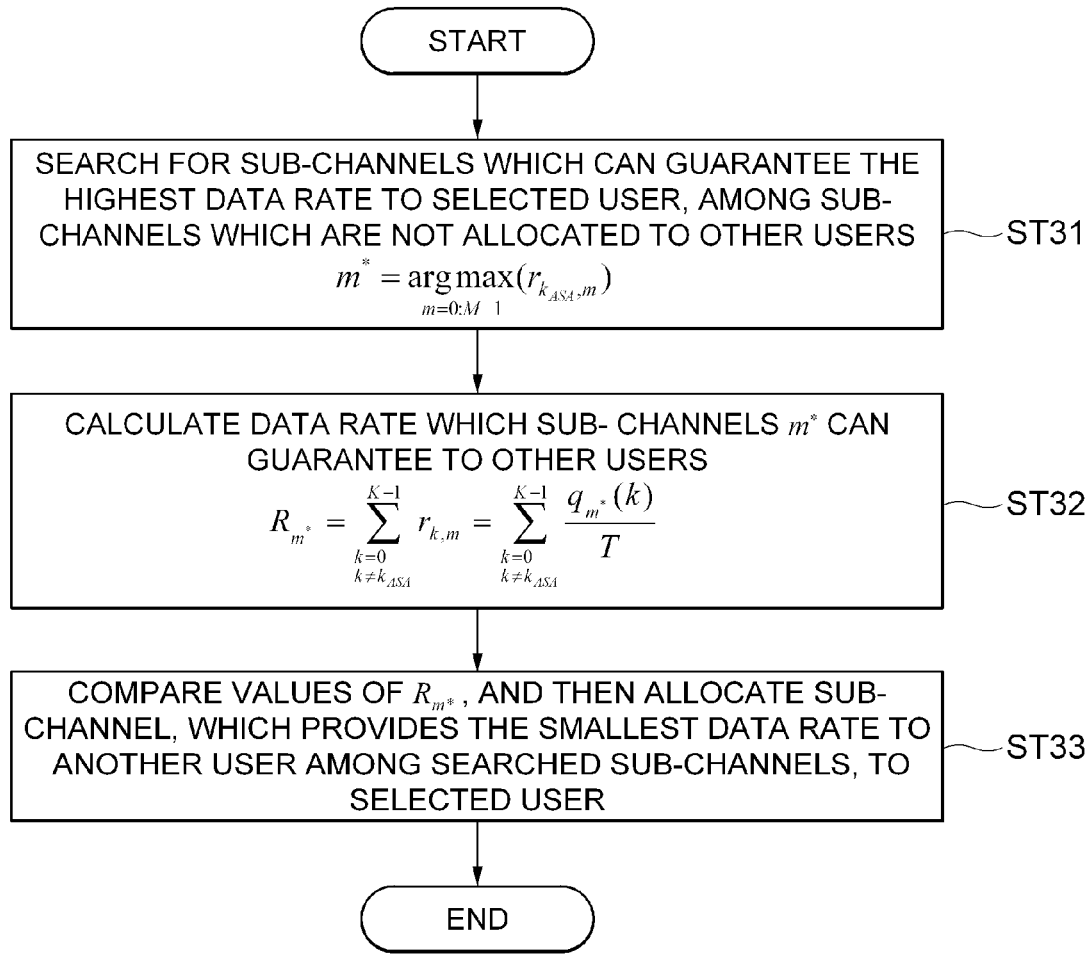
[FIG. 18]

FIG. 19

| Initilization | Algorithm |
|---|---|
| 1. Set of available subchannels : $A = \{0, 1, ..., M-1\}$ 2. For every user, the available set of subchannels are empty : $A_k = \{\}, \text{ for } k = 0, ..., K-1$ 3. Datarate of $k^{th}$ at user's at $n^{th}$ subchannel : $r_{k,n}$ | Set user's priority($k = 0 : K-1$) $T_k(t) = \left[1 - \frac{1}{T_c}\right] T_k(t-1) + \frac{1}{T_c} R_k(t-1)$ PF metric$_k = \frac{R_k(t)}{T_k(t)}$ end $k_{ASA} = \arg\max_k \text{PF metric}_k$ $m^* = \arg\max r_{k_{ASA},m}(m = 0 : M-1)$ If $k_{ASA}$ has multiple $m^*$, $m^*_{opt} \leftarrow \arg\min\left(\sum_{k=0, k \neq k_{ASA}}^{K-1} \frac{q_{m^*}(k)}{T}\right)$ else $m^*_{opt} \leftarrow m^*$ end Result update $A_{k_{ASA}} \leftarrow A_{k_{ASA}} \cup \{n^*_{opt}\}$ $R_k(t) \leftarrow r_{k_{ASA}, n^*_{opt}}$ $A \leftarrow A - \{n^*_{opt}\}$ |

[FIG. 20]
| | $k_1$ | $k_2$ | $k_3$ | $k_4$ |
|---|---|---|---|---|
| $m_1$ | 1 | 6 | 2 | 5 |
| $m_2$ | 2 | 6 | 6 | 8 |
| $m_3$ | 3 | 8 | 2 | 7 |
| $m_4$ | 9 | 3 | 6 | 4 |
| $m_5$ | 5 | 2 | 3 | 1 |
| $m_6$ | 2 | 2 | 1 | 6 |
| $m_7$ | 1 | 1 | 3 | 4 |
| $m_8$ | 2 | 7 | 2 | 9 |
⇒
| | $k_1$ | $k_2$ | $k_3$ | $k_4$ |
|---|---|---|---|---|
| $m_1$ | 0 | ⁶⑥ | 0 | 0 |
| $m_2$ | 0 | 0 | ³⑥ | 0 |
| $m_3$ | 0 | ²⑧ | 0 | 0 |
| $m_4$ | ¹⑨ | 0 | 0 | 0 |
| $m_5$ | ⁷⑤ | 0 | 0 | 0 |
| $m_6$ | 0 | 0 | 0 | ⁸⑥ |
| $m_7$ | 0 | 0 | ⁵③ | 0 |
| $m_8$ | 0 | 0 | 0 | ⁴⑨ |
[FIG. 21]
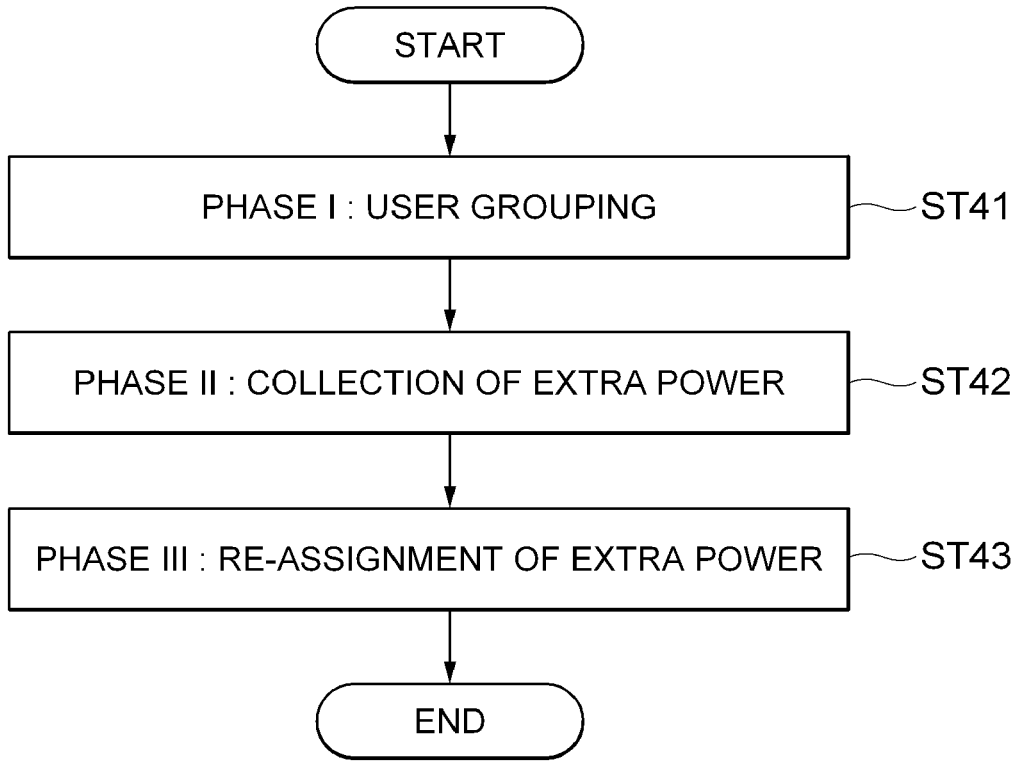

[FIG. 22]

$$\text{Group I} : R_{k_{MCS}} \geq R_{k_{req,min}}$$

$$\text{Group II} : R_{k_{MCS}} < R_{k_{req,min}}$$

$$\text{Group III} : CINR_k < CINR_{MCS\ 0}$$

[FIG. 23]

```
for each user u_k (k = 1 : K), do
    if ( CINR_MCS_m > CINR_U_k > CINR_MCS_{m-1} )
        Power_Extra ← (Power_U_k - Power_{CINR_{MCS_{m-1}}})
end for
```

[FIG. 24]

```
while(Power_Extra > 0)
    u_k* = arg max( MCS_{u_k} )
           u_k ∈ Group2
    Power* = Power_{MCS_{u_k*} + 1} - Power_{MCS_{u_k*}} if (Power_Extra ≥ Power*)
        Power_{U_k*} ← Power_{U_k*} + Power*
        Power_Extra ← Power_Extra - Power*
    else (Power_Extra < Power*)
        Power_{U_k*} ← Power_{U_k*} + Power_Extra
        Power_Extra ← 0 if (R_{u_k*} ≥ R_{req, min})
        Group 2 ← Group 2 - u_k*
        Group 1 ← Group 1 ∪ u_k* end while
```

FIG. 25

| Trial | 23 mW | +3 dBm | +6.9 dBm | +10 dBm | +11.8 dBm | +13 dBm |
|---|---|---|---|---|---|---|
| 1 | 5.54 | 5.70 | 6.25 | 6.69 | 7.57 | 8.11 |
| 2 | 2.76 | 3.06 | 3.61 | 4.32 | 4.93 | 5.46 |
| 3 | -2.87 | -2.56 | -2.02 | -1.32 | -0.70 | -0.17 |
| 4 | 5.76 | 6.06 | 6.61 | 7.32 | 7.93 | 8.46 |
| 5 | -9.67 | -9.37 | -8.82 | -8.11 | -7.51 | -6.97 |
| 6 | -15.99 | -15.71 | -15.14 | -14.43 | -13.82 | -13.29 |
| 7 | 3.1 | 3.40 | 3.95 | 4.67 | 5.28 | 5.81 |
| 8 | 1.78 | 2.10 | 2.62 | 3.34 | 3.95 | 4.48 |
| 9 | -5.01 | -4.71 | -4.16 | -3.45 | -2.84 | -2.31 |
| 10 | 14.04 | 14.37 | 14.86 | 15.61 | 16.21 | 16.74 |
| CINR INCREASE | | 0.31 | 0.85 | 1.54 | 2.17 | 2.70 |

→ MCS Level-down Step
→ MCS Level-up Step

| Mod | Coding | CINR | |
|---|---|---|---|
| 64QAM | 2/3 | 15.29 | ⤵ 2.47 |
| 64QAM | 1/2 | 12.82 | ⤵ 2.93 |
| 16QAM | 2/3 | 9.89 | ⤵ 2.46 |
| 16QAM | 1/2 | 7.43 | ⤵ 3.04 |
| QPSK | 2/3 | 4.39 | ⤵ 1.56 |
| QPSK | 1/2 | 2.83 | ⤵ 3.00 |
| QPSK | 1/4 | -0.17 | ⤵ 3.00 |
| QPSK | 1/8 | -3.17 | ⤵ 2.00 |
| QPSK | 1/12 | -5.17 | |

FIG. 26

[Data Rate(kbps) for MCS Level]

| Mod | Coding | 24 Sub-channel | 1 Sub-channel |
|---|---|---|---|
| QPSK | 1/12 | 691.2 | 28.8 |
| | 1/8 | 1,036.8 | 43.2 |
| | 1/4 | 2,073.6 | 86.4 |
| | 1/2 | 4,147.2 | 172.8 |
| | 2/3 | 5,529.6 | 230.4 |
| 16QAM | 1/2 | 8,294.4 | 345.6 |
| | 2/3 | 11,059.2 | 460.8 |
| 64QAM | 1/2 | 12,441.6 | 517.2 |
| | 2/3 | 16,588.8 | 691.2 |

User 1 (1 Sub-channel)
Target Data Rate : 256 kbps
Required MCS Level : 16QAM+1/2

User 2 (3 Sub-channel)
Target Data Rate : 256 kbps
Required MCS Level : QPSK+1/4

[FIG. 27]
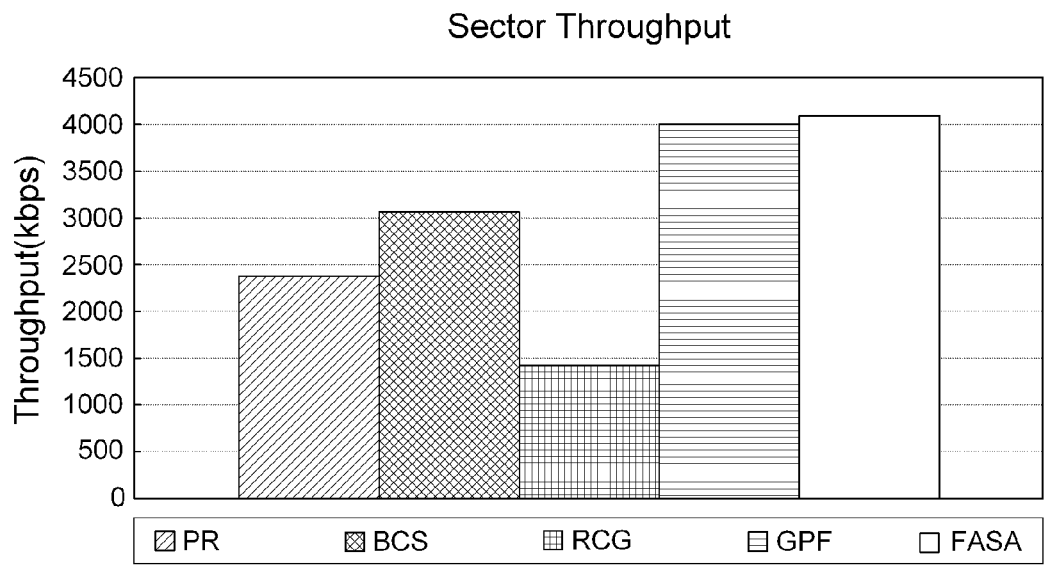
[FIG. 28]
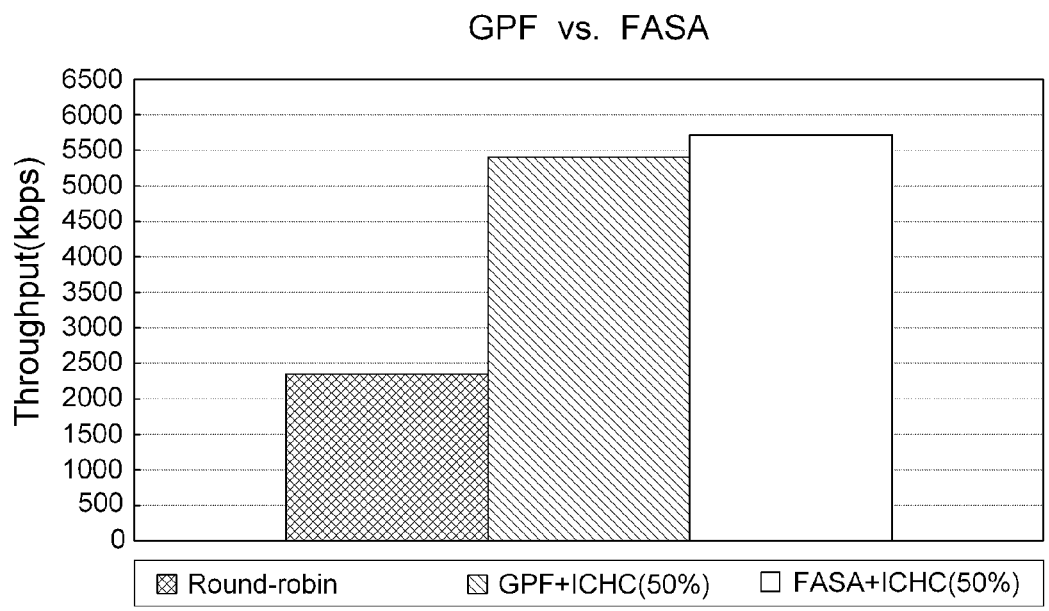

[FIG. 29]
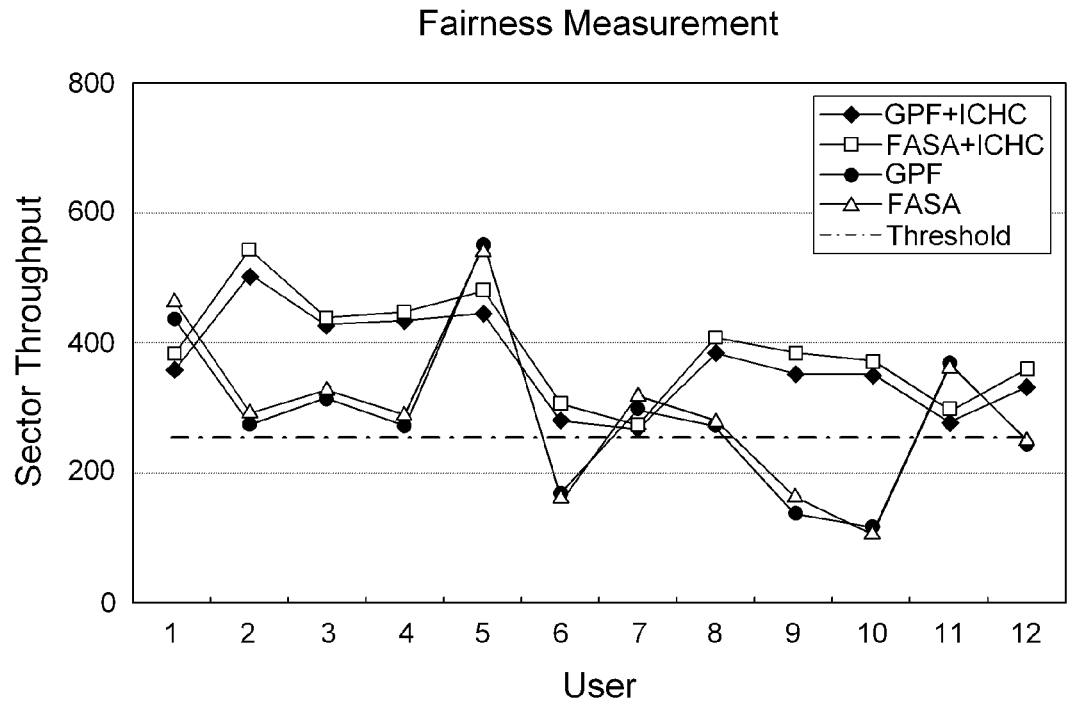
[FIG. 30]
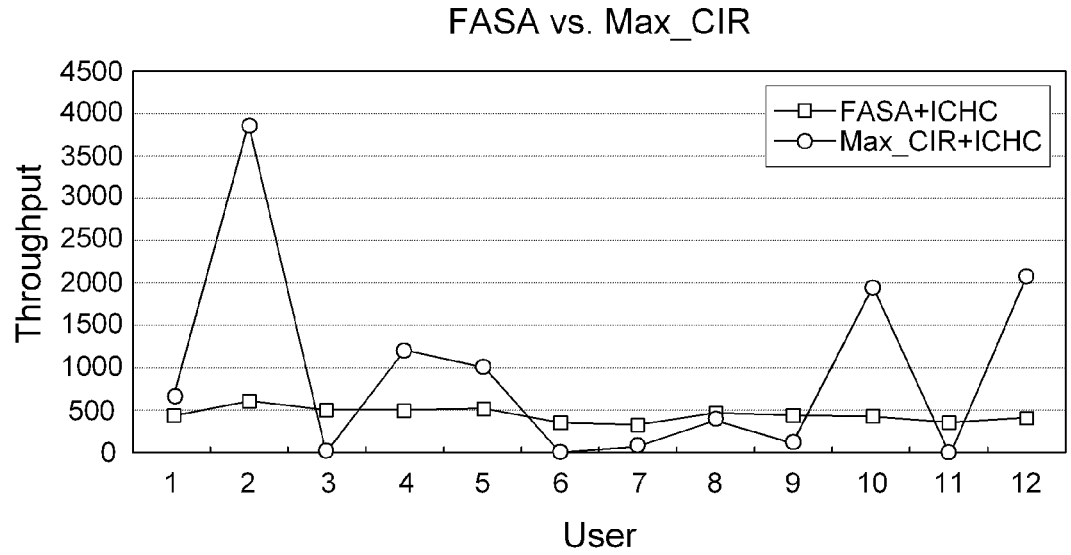

[FIG. 31]
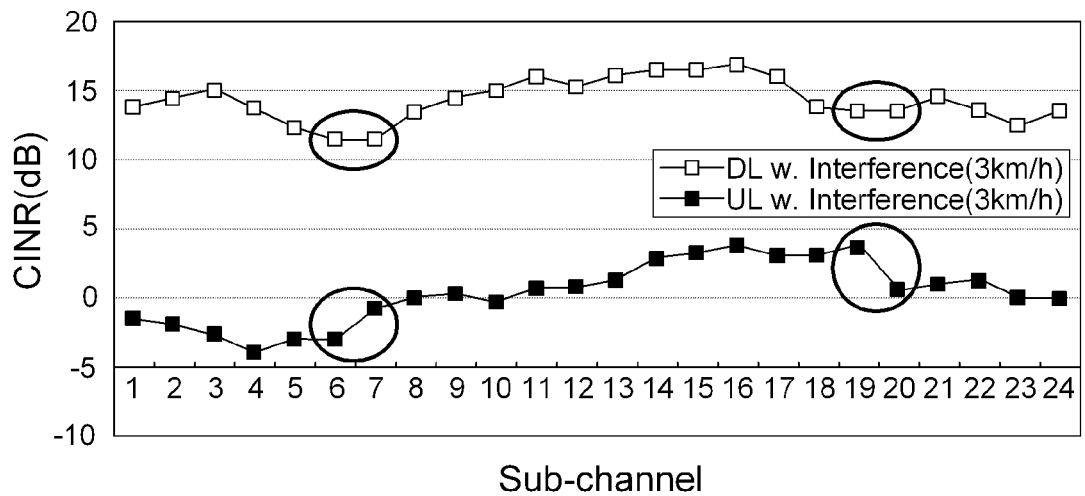
[FIG. 32]
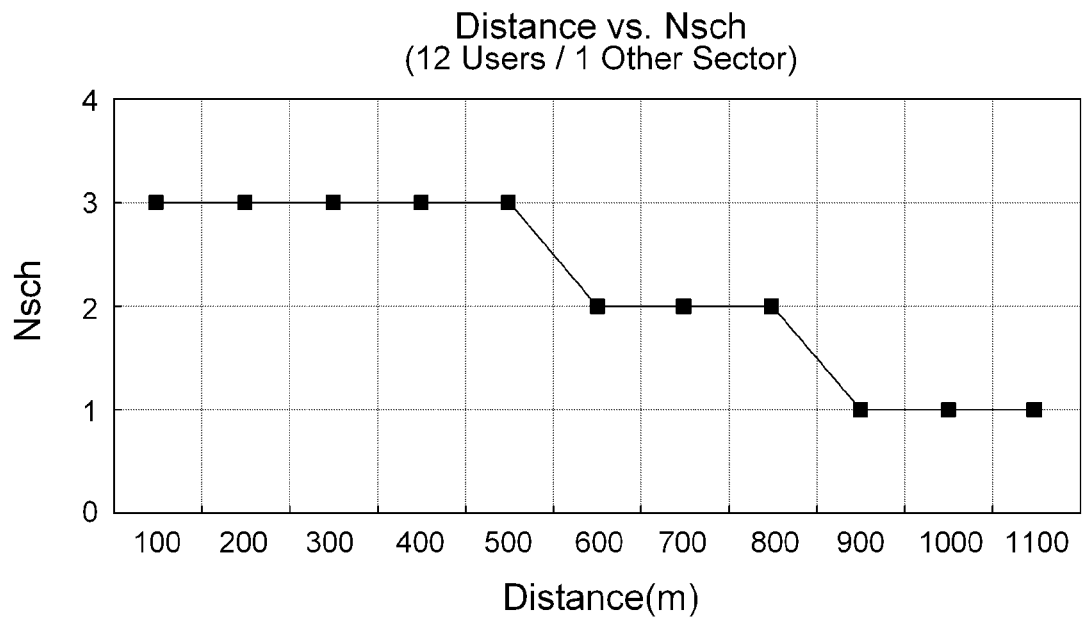

[FIG. 34]
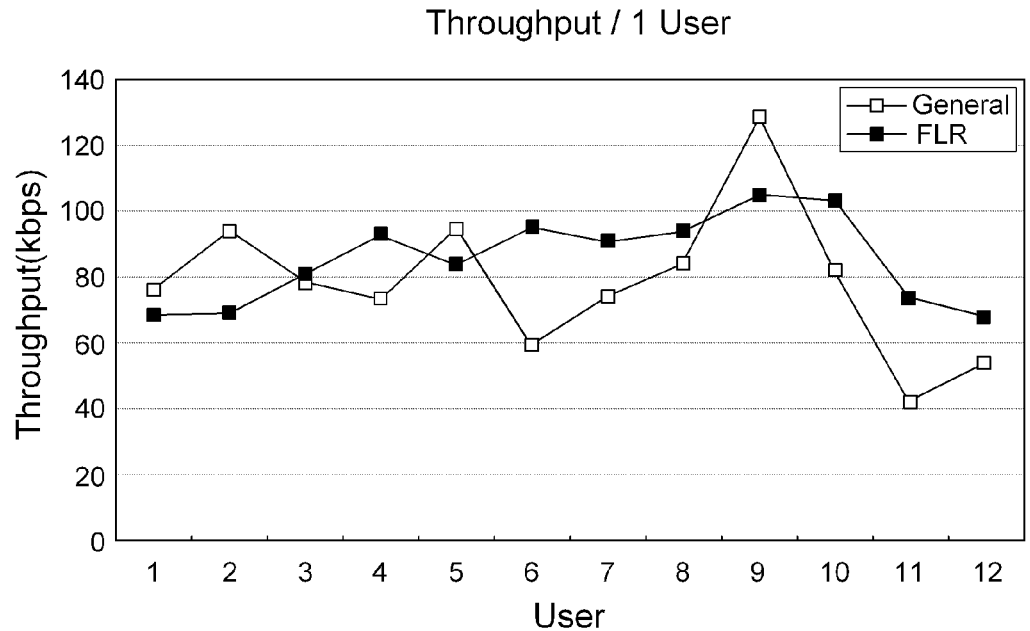
[FIG. 35]
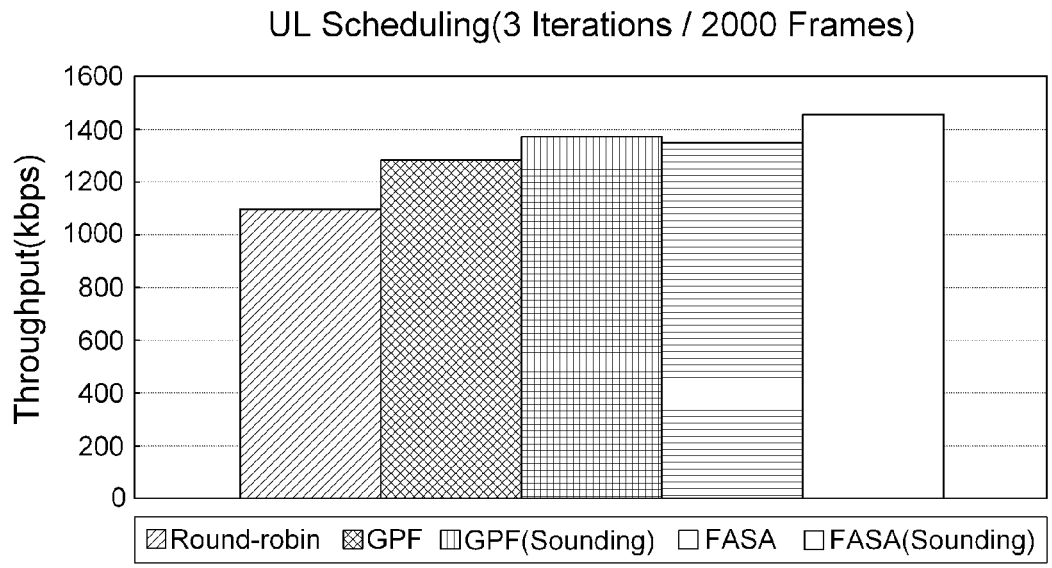

METHOD FOR DYNAMIC RESOURCE ALLOCATION OF UPLINK AND DOWNLINK IN OFDMA/TDD CELLULAR SYSTEM

CLAIM OF PRIORITY

This application claims priority under 35 USC 119 to Korean Patent Application No. 10-2006-0093546, filed on Sep. 26, 2006, which is incorporated by reference in its entirety.

BACKGROUND OF THE INVENTION

1. Field of the Invention

The present invention relates to an Orthogonal Frequency Division Multiple Access/Time Division Duplex (OFDMA/TDD) cellular system, and more specifically, to a method for dynamic resource allocation of uplink and downlink in an OFDMA/TDD cellular system, which is suitable for proposing an uplink and downlink dynamic resource allocation algorithm for enhancing the sector throughput and fairness of an 802.16e OFDMA/TDD cellular system.

2. Description of the Related Art

In general, an OFDM (Orthogonal Frequency Division Multiplexing) scheme is considered to be applied to the 4G mobile communication system because it has high transmission efficiency and supports a simple channel equalization scheme. Further, an OFDMA scheme based on the OFDM scheme is a multiuser access scheme which allocates different sub-carriers to each user. In the OFDMA scheme, resources are allocated in accordance with a user's request, thereby providing various QoS (Quality of Service). The OFDMA scheme is used at the physical layer of IEEE 802.16a and has been adopted as a wireless access scheme of the high-speed mobile Internet which is being actively studied in Korea.

However, to construct an OFDMA-based cellular system, studies on many fields should be continuously conducted. For example, studies on a cell planning method for increasing the coverage of an OFDMA cellular system and a resource allocation algorithm for effectively managing wireless resources to increase a cell capacity need to be conducted. Further, because of a characteristic of the cellular system, effective cell searching and development of synchronization algorithm are essential. In addition, studies on link adaptation, such as modulation level and dynamic channel allocation, and a dynamic modulation scheme are also needed to be conducted.

FIG. 1 is a diagram showing a frame structure of an 802.16e OFDMA TDD system. In FIG. 1, a downlink is composed of 27 symbols, in which the first symbol is used as a preamble, a MAP message header composed of more than two symbols is positioned next to the preamble, and the rest 24 symbols at the maximum are used as a data transfer section. Using the preamble, a base station can maintain synchronization and obtain channel information on sub-channels of each user. An uplink is composed of 15 symbols, in which first three symbols are used as a CQI (Channel Quality Indication) section. The CQI section serves to transfer to the base station the channel information on sub-channels of each user, which is measured using a downlink preamble. The rest 12 symbols are used as a data transfer section.

FIG. 2 is a diagram showing a classification of dynamic resource allocation algorithm. A dynamic resource allocation algorithm is roughly divided into an optimal dynamic resource allocation algorithm and a sub-optimal dynamic resource allocation algorithm. The optimal dynamic resource allocation algorithm is where a sub-channel and proper power, which satisfy a data rate requested by a user, are simultaneously allocated by Lagrange relaxation. The optimal dynamic resource allocation algorithm is not used in an actual system, because the calculation is complicated. The sub-optimal allocation algorithm is where a sub-channel is first allocated to a user and proper power is then allocated in accordance with the sub-channel. The sub-optimal dynamic resource allocation algorithm has an advantage in that an amount of calculation is much smaller than in the optimal dynamic resource allocation algorithm. The sub-optimal dynamic resource allocation algorithm is classified into a transmission power margin dynamic (margin adaptive) algorithm and a data rate dynamic (rate adaptive) algorithm.

FIG. 3 is a diagram showing a classification of the sub-optimal dynamic resource allocation algorithm. The sub-optimal dynamic resource allocation algorithm is roughly classified into a dynamic channel allocation algorithm and a dynamic power allocation algorithm. The dynamic channel allocation algorithm is classified into three algorithms depending on fairness, throughput, and QoS. The dynamic power allocation algorithm is classified into an optimal power allocation algorithm, an EBPU (Equal Band per User) algorithm, and an EBP (Equal Band Power) algorithm.

FIG. 4 is a process of a BABS (Bandwidth Assignment based on the SNR) algorithm which is one of the dynamic channel allocation algorithms. In the BABS algorithm, the following two conditions are assumed. Firstly, a frequency band provided to a system is infinite. Therefore, a sufficient frequency band is present, which can satisfy a data rate requested by each user. Secondly, when a sub-channel is additionally allocated to a user to which a large number of sub-channels are allocated, consumed transmission power is smaller than when a sub-channel is additionally allocated to a user to which a small number of sub-channels are allocated.

In the process, a data rate $\overline{R_k}$, which can be provided to the respective users from one sub-channel in a current channel state, is calculated using the average channel value of all sub-channels fed back from the users. Then, the number of sub-channels $m_k$ is determined, which can satisfy a data rate $R_{k,req}$ requested by each of the users.

If the sum of sub-channels $m_k$ to be allocated to the respective users exceeds the number of overall sub-channels, the sub-channels of a user to whom the smallest number of sub-channels have been allocated are canceled one by one until the sum of sub-channels $m_k$ does not exceed the number of overall sub-channels. This is based on the second condition. Specifically, when the sub-channels of a user to whom a small number of sub-channels are allocated are canceled, a transmission power gain is larger than when the sub-channels of a user to whom a large number of sub-channels are allocated are canceled. If the sum of sub-channels $m_k$ to be allocated to the respective users is smaller than the number of overall sub-channels, a sub-channel is additionally allocated to a user, to whom a sub-channel can be allocated with the smallest additional transmission power $G_K$, until the sum of sub-channels $m_k$ becomes equal to the number of overall sub-channels. Through such a process, the number of sub-channels to be allocated to each user is calculated.

FIG. 5 is a process of an RCG (Rate Craving Greedy) algorithm. After the number of sub-channels $m_k$ to be allocated to each user is determined through the BABS algorithm, the sub-channels are allocated to the user by using channel information. The RCG algorithm is one of the downlink sub-optimal dynamic channel allocation algorithms which allocate subcarriers to users. The RCG algorithm is aimed at maximizing the sum of transmission rates by using a method of estimating transmission rates of users at the respective sub-channels.

The base station allocates a sub-channel to a user who can transmit data at the maximum data rate for each sub-channel. Then, when the number of allocated sub-channels for each user is larger than the required number of sub-channels $m_k$ which is previously determined by the BABS algorithm, a user who can minimize the loss of the overall data rate of the system is searched for, among users to whom sub-channels are not allocated by the predetermined number of sub-channels. Further, unallocated sub-channels are searched for. Then, sub-channel re-allocation is performed.

FIG. 6 shows an example of an RCG sub-channel allocation algorithm. The process thereof is performed as follows.

1) It is assumed that the number of sub-channels, which are to be allocated to each user by the BABS algorithm, is set to two.

2) At a first sub-channel, the corresponding sub-channel is allocated to a first user who has the highest channel gain.

3) At a second sub-channel, the corresponding sub-channel is allocated to the first user who has the highest channel gain.

4) From a third sub-channel to the last sub-channel, the above-described process is repeatedly performed.

5) Since the first user has received a larger number of sub-channels than the number of sub-channels to be allocated to the user, two sub-channels should be re-allocated to other users.

6) At this time, to minimize the loss of the entire system, the first and second sub-channels of the first user are re-allocated to a fourth user and a second user, respectively.

7) Since a third user also has received a larger number of sub-channels than the number of sub-channels to be allocated, one sub-channel is re-allocated by the same process.

The RCG algorithm has an advantage in that fairness is guaranteed to all users while the loss of the entire system is minimized. However, since the complex sub-channel allocation should be performed two times, a burden of complexness is present.

FIG. 7 is a diagram showing a first step of a BCS (Best Channel Selection per user considering fairness) algorithm.

The BCS algorithm is an algorithm which considers fairness, in consideration of an actual data rate of a user. The BCS algorithm is composed of two steps.

At the first step shown in FIG. 7, a user is selected, who has the smallest ratio of the sum of data rates allocated up to now to a requested data rate. In FIG. 7, four users require a data rate of 400 kbps. Among them, a first user has acquired a data rate of 100 kbps up to now. Therefore, the first user is selected in consideration of fairness.

FIG. 8 is a diagram showing a second step of the BCS algorithm. In the second step, a sub-channel which guarantees the best data rate is allocated to the selected user. Among the sub-channels of the first user determined by the first step of FIG. 7, a sixth sub-channel has the highest channel gain. Therefore, the base station allocates the sixth sub-channel to the first user, because the sixth sub-channel can guarantee a high data rate.

FIG. 9 is a diagram showing the concept of an FLR (Full Loading Range) algorithm which is a conventional uplink dynamic resource allocation algorithm. In a system using the OFDMA TDD scheme, a terminal can use at least one channel or all channels at the maximum, in order to satisfy various data rates and service levels for each user. Therefore, since the power of a DAC output signal is variable depending on the number of sub-channel $N_{SCH}$ allocated to an uplink, the transmission power of the terminal is determined by the number of sub-channel $N_{SCH}$ and a gain of a power amplifier. Accordingly, in the power control of the OFDMA system, a path loss according to a change in distance between the base station and the terminal and the number of sub-channels $N_{SCH}$ should be considered synthetically.

Further, since the terminal is designed to use smaller transmission power than the base station, limitation of an FLR where the terminal can use all sub-channels should be considered simultaneously. In a terminal within the FLR, the gain of the power amplifier is adjusted in accordance with a distance between the base station and the terminal, and the power of a DAC output signal is proportional to the number of sub-channels $N_{SCH}$. Therefore, while open-loop power control is used, closed-loop power control can be performed by the same method as a CDMA system.

Outside the FLR, however, although a distance between the base station and a terminal is increased, the gain of the power amplifier is fixed to the maximum value and does not increase any more. Therefore, uplink transmission power changes in accordance with the number of sub-channels $N_{SCH}$. Further, when the number of sub-channels $N_{SCH}$ is constant, transmission power becomes constant regardless of the distance between the base station and the terminal. Therefore, when an uplink signal transmitted from the outside of the FLR is received by an antenna of the base station, a target SNR (Signal-to-Noise Ratio) cannot be satisfied because power for each sub-channel is insufficient. To solve such a problem, a method of increasing power of the sub-channel is applied.

In the mobile environment, however, a received signal of a terminal is affected by AWGN (Additive White Gaussian Noise), a path loss, multi-path fading, shadowing and the like. Therefore, a standard deviation of 8-12 dB occurs in received power. Because of this, the method of determining an FLR by using a received SNR is very complicated and is not accurate. Further, the number of sub-channels to be allocated to each user and inaccuracy of power control are increased. Accordingly, an interference with other users occurs, and the performance of the system is degraded.

SUMMARY OF THE INVENTION

An advantage of the present invention is that it provides a method for dynamic resource allocation of uplink and downlink in an OFDMA/TDD cellular system, which is suitable for proposing an uplink and downlink dynamic resource allocation algorithm for enhancing the sector throughput and fairness of an 802.16e OFDMA/TDD cellular system.

Additional aspects and advantages of the present general inventive concept will be set forth in part in the description which follows and, in part, will be obvious from the description, or may be learned by practice of the general inventive concept.

According to an aspect of the invention, a method for dynamic resource allocation of uplink in an OFDMA/TDD cellular system comprising the steps of determining the number of sub-channels which can be allocated to each user through an FLR algorithm; performing channel allocation for a first frame through a round-robin algorithm in which channel information is not needed; performing dynamic channel allocation for a next frame through uplink channel information measured by uplink channel sounding; and performing power control.

According to another aspect of the invention, a method for dynamic resource allocation of downlink in an OFDMA/TDD cellular system comprising the steps of selecting a user through a GPF algorithm; performing dynamic channel allocation through an ASA (Aggressive Sub-channel Allocation)

algorithm so as to perform a FASA (Fairness insured Aggressive Sub-channel Allocation) algorithm for obtaining a multiuser diversity gain; and performing dynamic power allocation through an improved CHC (Chang, Heo and Cha) algorithm, in consideration of a data rate provided to each user and a channel state. Here, CHC is from names of inventors of the algorithm, Chang, Heo and Cha.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 2 is a diagram showing a classification of dynamic resource allocation algorithm;

FIG. 3 is a diagram showing a classification of sub-optimal dynamic resource allocation algorithm;

FIG. 4 shows a process of the BABS algorithm;

FIG. 5 shows a process of the RCG algorithm;

FIG. 6 shows an example where sub-channels are allocated to users by the RCG algorithm;

FIG. 7 is a diagram showing a first step of the BCS algorithm;

FIG. 9 is a diagram showing the concept of the FLR algorithm which is a conventional uplink dynamic resource allocation algorithm;

FIG. 10 is a flow chart showing a method for dynamic resource allocation of uplink in an OFDMA/TDD cellular system according to an embodiment of the present invention;

FIG. 13 is a diagram showing a Golay sequence used for generating a sequence of the uplink channel sounding of FIG. 11;

FIG. 14 is a table for determining an offset of the Golay sequence of FIG. 13;

FIG. 15 is a detailed flow chart for explaining power control of FIG. 10;

FIG. 16 is a diagram for explaining rate adaptive inner closed-loop power control and margin adaptive inner closed-loop power control, depending on a data rate provided to a user;

FIG. 17 is a flow chart showing a method for dynamic resource allocation of downlink in an OFDMA/TDD cellular system according to another embodiment of the invention;

FIG. 18 is a detailed flow chart showing the FASA algorithm using the GPF and ASA algorithms;

FIG. 19 is a diagram for explaining the FASA algorithm which is a downlink dynamic channel allocation algorithm;

FIG. 20 shows an allocation result through the FASA algorithm;

FIG. 21 is a flow chart for explaining the improved CHC algorithm which is a dynamic power allocation algorithm;

FIG. 22 is a diagram showing an example of user grouping which is a first step of the improved CHC algorithm;

FIG. 23 is a diagram showing an example of collection of extra power which is a second step of the improved CHC algorithm;

FIG. 24 is a diagram showing an example of re-assignment of extra power which is a third step of the improved CHC algorithm;

FIG. 25 is a diagram for explaining a process of determining the magnitude of power for one stage when the collection of extra power and the re-assignment of extra power are performed;

FIG. 26 is a diagram for explaining a process of determining an MCS level by calculating a required amount of power according to the number of sub-channels allocated to a user;

FIG. 27 is a diagram showing the sector throughput of each algorithm when only the downlink dynamic channel allocation is performed according to the present invention;

FIG. 28 is a diagram showing the sector throughput of each algorithm after both of the downlink dynamic channel allocation and the downlink dynamic power allocation are performed according to the present invention;

FIG. 29 is a diagram comparing fairness, when only the downlink dynamic channel allocation is performed, with fairness after the improved CHC algorithm is applied according to the present invention;

FIG. 30 is a diagram comparing the fairness of the FASA algorithm, which is the proposed dynamic channel allocation algorithm, with the fairness of an existing Max CIR (Carrier-to-Interference-power-Ratio) algorithm;

FIG. 31 is a graph showing a difference in channel information at the same sub-channel of uplink and downlink when interference from an adjacent cell exists;

FIG. 32 is a graph showing the number of sub-channels to be allocated for each distance;

FIG. 34 is a diagram comparing the fairness of a general round-robin algorithm with the fairness of a round-robin algorithm using the FLR algorithm and the rate dynamic/margin dynamic inner closed-loop power control algorithm; and FIG. 35 is a diagram for explaining a result where the uplink dynamic resource allocation is performed using uplink channel information obtained by uplink channel sounding.

DETAILED DESCRIPTION OF THE PREFERRED EMBODIMENTS

Figure 1:
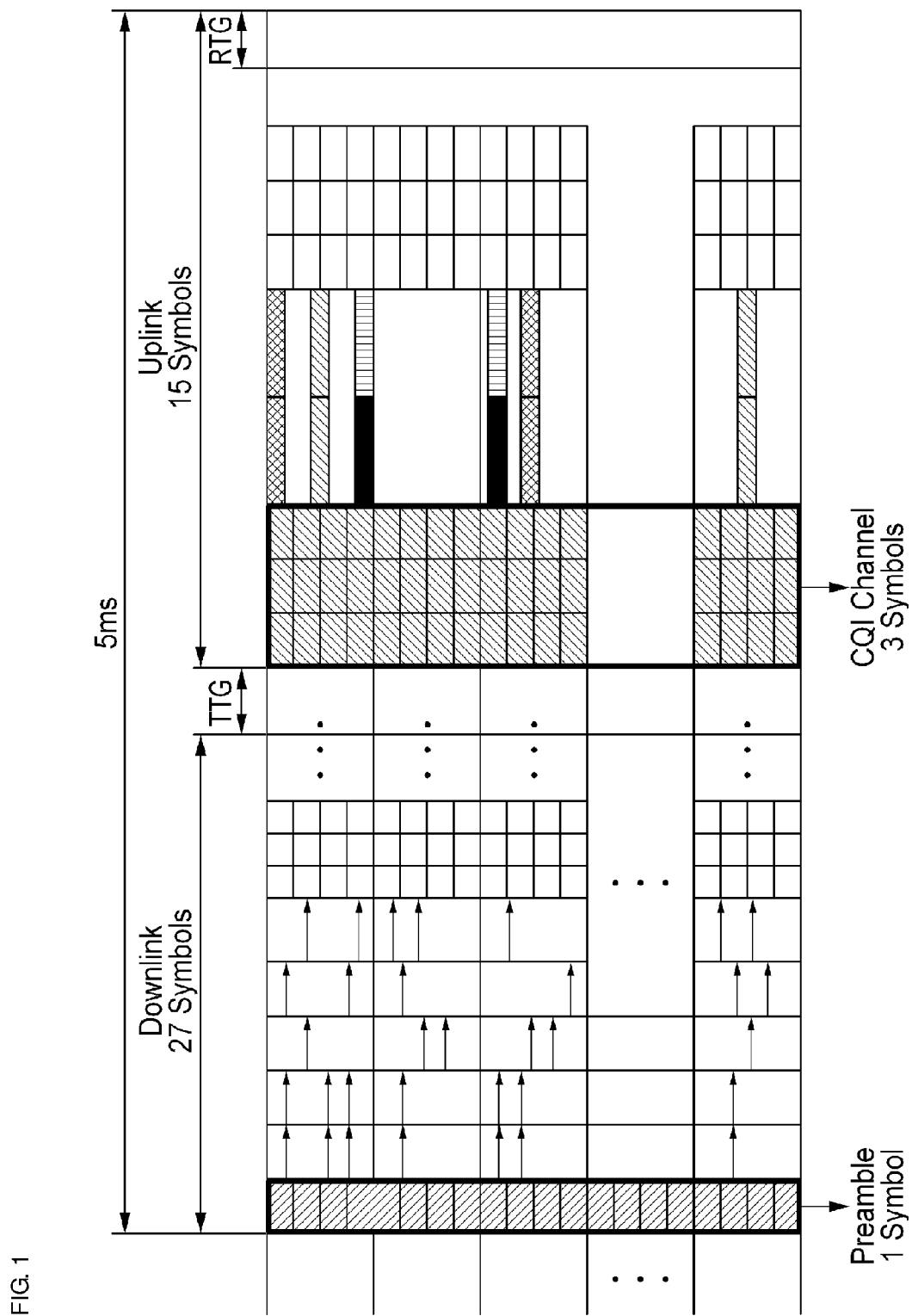
FIG. 1 is a diagram showing a frame structure of a general 802.16e OFDMA TDD system.
Figure 8:
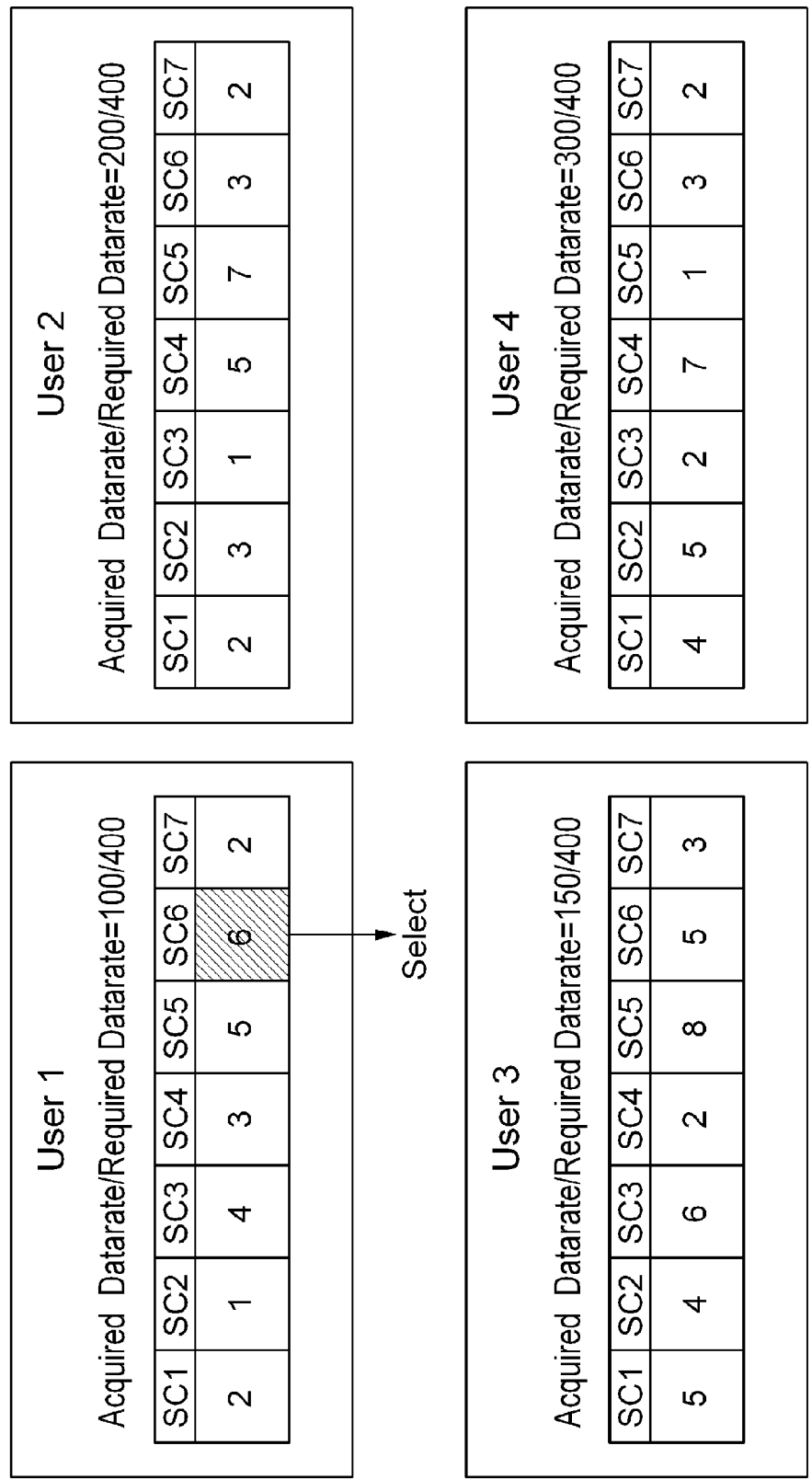
FIG. 8 is a diagram showing a second step of the BCS algorithm.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a method for dynamic resource allocation of uplink and downlink in OFDMA/TDD cellular system according to the present invention will be described in detail with reference to the accompanying drawings.

FIG. 10 is a flow chart showing a method for dynamic resource allocation of uplink in an OFDMA/TDD cellular system according to an embodiment of the invention.

As shown in FIG. 10, the method for dynamic resource allocation of uplink in an OFDMA/TDD cellular system according to an embodiment of the invention includes the steps of: determining the number of sub-channels which can be allocated to each user through the FLR algorithm (ST1); performing channel allocation through a round-robin algorithm, in which channel information is not needed, because there is no channel information in a first frame for dynamic channel allocation after step ST1 (ST2); performing dynamic channel allocation through uplink channel information measured by uplink channel sounding after step ST2 (ST3); and performing power control using the rate adaptive inner closed-loop scheme or margin adaptive inner closed-loop scheme after step ST3 (ST4).

As shown in FIG. 15, step ST4 includes the steps of: judging whether a data rate requested by a user is satisfied or not (ST11); applying a rate adaptive inner-closed loop power control algorithm to a user if the required data rate is satisfied (ST12); and applying a margin dynamic inner-closed loop power control algorithm to the user if the requested data rate is not satisfied (ST13).

FIG. 17 is a flow chart showing a method for dynamic allocation of downlink in an OFDMA/TDD cellular system according to another embodiment of the invention.

As shown in FIG. 17, the method for dynamic resource allocation of up and down link in an OFDMA/TDD cellular system according to another embodiment of the invention includes the steps of: selecting a user through the GPF algorithm (ST21); performing the FASA algorithm for obtaining a multiuser diversity gain by performing dynamic channel allocation through the ASA algorithm (ST22); and performing dynamic power allocation through an improved CHC algorithm in consideration of a data rate provided to each user and a channel state after step ST22 (ST23).

As shown in FIG. 18, step ST22 includes the steps of: searching for sub-channels, which can guarantee the highest data rate to the selected user, among sub-channels which are not allocated to another user (ST31); calculating data rates which the sub-channels can guarantee to other users after step S31 (ST32); and comparing the data rates calculated at step ST32 and then allocating a sub-channel, which provides the smallest data rate to another user among the searched sub-channels, to the selected user (ST33).

At step ST31, the sub-channel is searched for by $$m^* = \underset{m=0:M-1}{\mathrm{argmax}}(r_{k_{ASA},m}),$$

where $$r_{k_{ASA},m}$$

represents a data rate which can be guaranteed to a selected user $k_{ASA}$ at an $m^{th}$ sub-channel, and m* represents a sub-channel, which can guarantee the highest data rate to a user $k_{ASA}$, among the overall sub-channels. In this case, one or more sub-channels m* may exist.

At step ST32, the data rates are calculated by the following equation:

$$R_{m^*} = \sum_{\substack{k=0 \\ k \neq k_{ASA}}}^{K-1} r_{k,m} = \sum_{\substack{k=0 \\ k \neq k_{ASA}}}^{K-1} \frac{q_{m^*}(k)}{T}.$$

Here, $R_{m^*}$ represents the sum of data rates which can be guaranteed to all users, except for a selected user, at a sub-channel m*.

As shown in FIG. 21, step ST23 includes the steps of: grouping users (ST41); collecting extra power after step ST41 (ST42); and re-assigning the collected extra power after step ST42 (ST43).

At step ST41, users who receive a larger amount of data than at a requested data rate are designated as a first group, users who receive a smaller amount of data than at a requested data rate are designated as a second group, and users who do not even satisfy a target CINR (Carrier to Interference Plus Noise Ratio) of the lowest MCS level because of a poor channel state are designated as a third group.

At step ST42, power is collected little by little for several stages such that the current MCS levels of users from whom power is collected are not reduced.

At step ST43, power is preferentially re-assigned to a user, who has the highest MCS level, among the corresponding users. In this case, power is re-assigned little by little for several stages, in order to prevent unnecessary power consumption. In this step, extra power to be re-assigned is determined in accordance with the number of sub-channels allocated to each user and then re-assigned to the user.

Now, the method for dynamic resource allocation of uplink and downlink in an OFDMA/TDD cellular system according to an embodiment of the invention will be described with reference to the drawings. When it is judged that the specific description of related known function or constitution can cloud the point of the invention, the description will be omitted. Terms to be described below are defined in consideration of the functions of the invention, and can differ in accordance with the intension of a user and operator or the practice. Accordingly, the meaning of the terms should be interpreted on the basis of the content of the specification.

The present invention proposes an algorithm for dynamic resource allocation of uplink and downlink which enhances sector throughput and fairness in an 802.16e OFDMA/TDD cellular system.

The FASA algorithm proposed in the downlink is a dynamic channel allocation algorithm in which a user is selected by considering a momentary channel state of the user and a provided data rate at the same time, and the most proper sub-channel is allocated to the selected user. Further, the proposed improved CHC algorithm classifies users into three groups on the basis of a channel state, and performs dynamic power allocation through the collecting and re-assigning of extra power, thereby enhancing the throughput and fairness of the system.

In the uplink, the existing FLR algorithm, in which a difficulty of dynamic resource allocation using channel information is mentioned and the number of sub-channels allocated depending on each distance is determined, and the rate adaptive or margin adaptive inner-closed loop power control algorithm are applied so as to increase the fairness of the system. Further, the dynamic resource allocation using uplink channel sounding is proposed.

In the downlink environment, it can be found through a simulation test that the FASA algorithm exhibits more excellent throughput than the round-robin algorithm, the BCS algorithm, and the GPF algorithm. Further, in the case of the FASA algorithm, additional throughput and fairness enhancement can be achieved through the improved CHC algorithm. In the uplink environment, throughput enhancement can be achieved through the FLR algorithm and the rate dynamic or margin dynamic inner-closed loop power control, and performance enhancement can be achieved in terms of fairness. Further, as the dynamic channel allocation using uplink channel information is performed, it is possible to obtain a throughput higher than when the FLR algorithm or downlink channel information is used.

FIG. 10 is a flow chart showing the method of dynamic resource allocation of uplink in an OFDMA/TDD cellular system according to an embodiment of the invention.

For dynamic resource allocation of uplink, the number of sub-channels, which can be allocated to each user, is determined through the existing FLR algorithm (ST1). Further, since a first frame does not have channel information for dynamic resource allocation, channel allocation is performed through the round-robin algorithm in which channel information is not needed (ST2). Then, the dynamic channel allocation is performed through uplink channel information measured by uplink channel sounding (ST3). After that, the rate adaptive or margin adaptive inner-closed loop power control algorithm is applied so as to perform power control (ST4).

In the present invention, a method of determining an FLR by using ranging information of an OFDMA system is used, in order to overcome the problem of the conventional method. An uplink receiver of the OFDMA system performs FFT (Fast Fourier Transform) on signals, which are transmitted from terminals and received by an antenna of a base station, and then demodulates the transmitted signals from users. At this time, if the signals of the respective terminals received by the antenna of the base station do not arrive within a CP interval from a demodulation reference time, it is impossible to demodulate the signals. As time elapses from the demodulation reference time, the performance of a channel estimator decreases. Therefore, the transmission time of each terminal is controlled in such a manner that the transmitted signal from the terminal arrives at time as close to the reference time as possible. Such a process is performed through ranging. After transmission timing of the terminal is determined through initial ranging, the transmission timing of the terminal is controlled every one second through periodic ranging. FIG. 9A is a diagram showing a case where the FLR algorithm is not applied. In this case, there is no limitation in the number of sub-channels which can be allocated to users located outside the FLR. Outside the FLR, transmission power changes in accordance with the number of sub-channels $N_{SCH}$. When the number of sub-channels $N_{SCH}$ is constant, the transmission power is constant, regardless of a distance between the base station and the terminal. Therefore, a path loss increases so that the power of a signal received by the antenna of the base station becomes insufficient. Then, a required SNR (Signal-to-Noise Ratio) is not satisfied. FIG. 9B is a diagram showing a case where the FLR algorithm is applied. In this case, when the number of sub-channels $N_{SCH}$ is limited in accordance with the position of the terminal outside the FLR, sub-channel power is increased, so that sub-channel power of a signal received by the antenna of the base station can be constantly maintained. Therefore, when the number of sub-channels $N_{SCH}$ and a PCG gain are controlled depending on the position of the terminal, it is possible to guarantee the uplink performance of the system.

Figure 11:
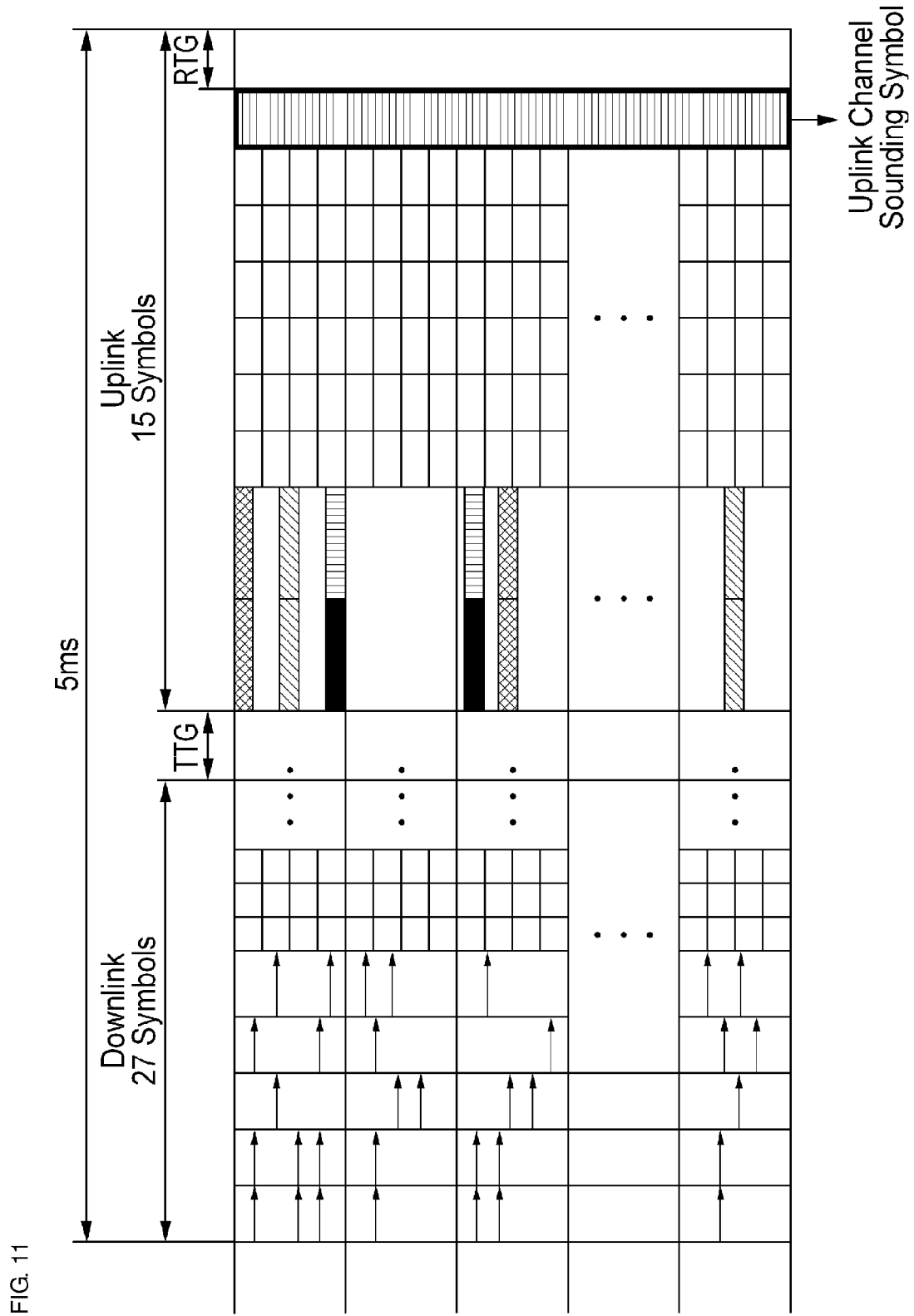
FIG. 11 is a diagram showing an uplink channel sounding signal in a frame structure.

FIG. 11 is a diagram for explaining a signaling scheme in which a user transmits a channel sounding waveform in uplink so as to determine base-station-to-user channel information under assumption of TDD reciprocity. Only a user who can use CSIT (Channel State Information Transmission) can support this scheme. Further, a closed-loop transmission scheme can be used through this scheme. Through the signaling scheme described herein, the base station measures uplink channel information when transmission and reception hardware is properly corrected. Then, the base station can predict channel information of downlink through the measured information. Further, a user may receive an instruction to periodically transmit a sounding signal such that downlink channel information can be predicted in a mobile environment. A sounding region is composed of one or more OFDMA symbol intervals existing in an uplink frame interval used by the user, and a sounding signal is transmitted to the base station such that channel information between the base station and the user is determined within a short time. Each sounding frequency band is composed of 18 continuous OFDMA sub-carriers. In a case of the 802.16e OFDMA TDD system, the number of data sub-carriers is 864. Therefore, the sounding region includes 48 (864/18) sounding frequency bands at the maximum. Further, in this scheme, latency is smaller than in a case where downlink channel information is measured using a preamble and downlink/uplink dynamic resource allocation is then performed using the measured channel information.

Figure 12:
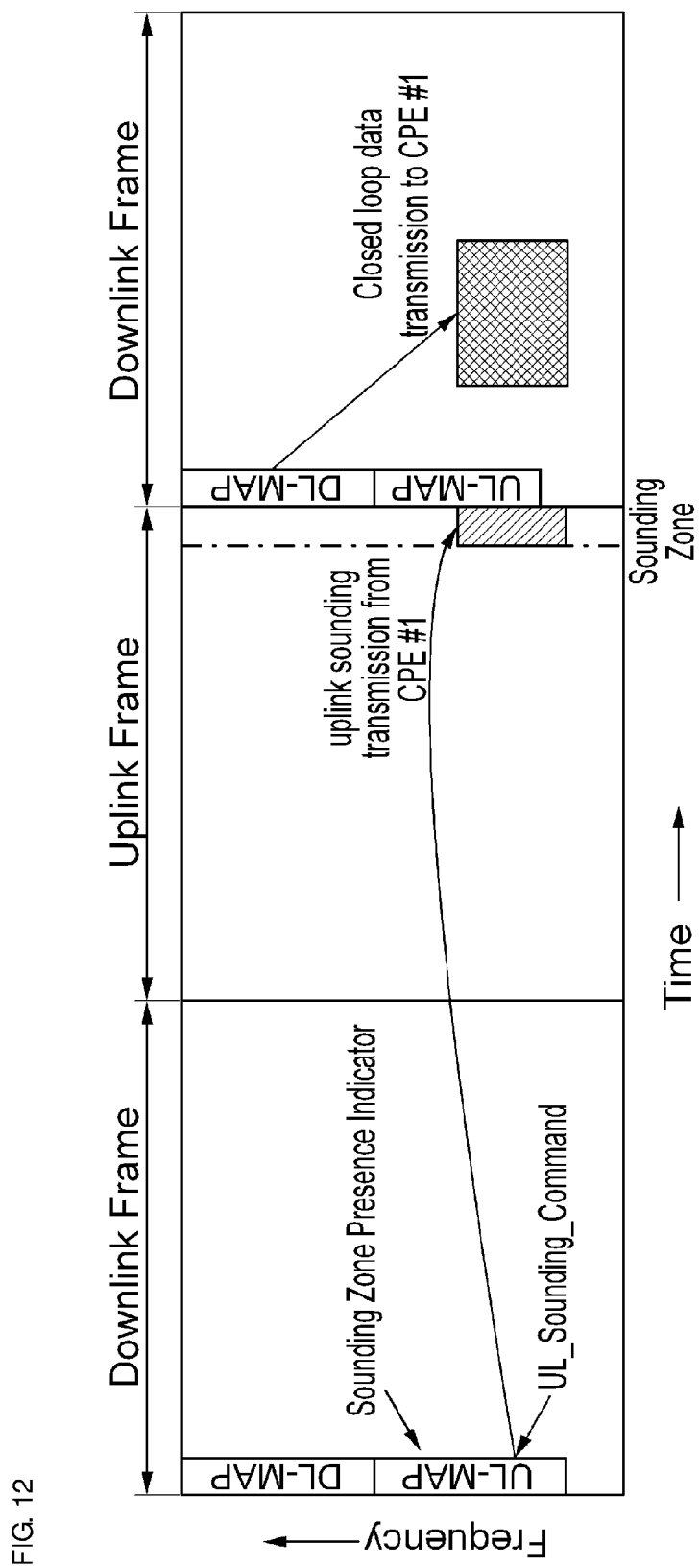
FIG. 12 is a diagram showing an uplink channel sounding applying method of FIG. 11.

FIG. 12 is a diagram showing a channel sounding process. In this process, an interval within the sounding region, at which a user should transmit channel information, is determined through UL-MAP existing in a downlink frame interval, and a closed-loop transmission scheme is applied to the corresponding interval through DL-MAP of the next frame by using the channel information. A method of allocating a sounding frequency band to each user is divided into A-type and B-type.

The A-type is divided in two methods. A first method is where each user occupies all sub-carriers within sounding allocation. Through this method, a plurality of users use the same sounding sequence defined below. However, the respective users increase a fundamental sounding sequence through phase shifting of a different frequency domain. The sequence of each user is determined by Equation 1.

$$S_{un}(k) = S_u(k)e^{-j\frac{2\pi kn}{P}}$$ [Equation 1]

Here, k represents the index of an occupied sub-carrier, P represents the maximum cyclic shift index, and n represents an allocated cyclic time shift index with a range of 0 to p−1. Further, p and n are determined from a sounding instruction. In addition, the sequence $S_u(k)$ is obtained by cyclic-shifting a sequence S(k) by an offset u. The sequence S(k) is a binary expression as a lower sequence of a Golay sequence of FIG. 13, and the start position thereof is determined through an offset (Ls) shown in FIG. 14.

A second method is where a user has a decimation sub-carrier group (every 16th sub-carrier). That is, although a plurality of users can occupy the same sounding allocation, the respective users use a sub-carrier group which is not duplicated within the sounding allocation. The sub-carriers occupied by the respective users should be demodulated by BPSK (Binary Phase Shift Keying) symbols through the same method.

In the B-type, a plurality of users are not allowed to multiplex sounding transmission in the same band through a sounding instruction by UL_Sounding_Command_IE( ).

FIG. 15 is a detailed flow chart showing the power control of FIG. 10. First, it is judged whether a data rate requested by a user is satisfied or not (ST11). When the data rate is satisfied, the rate dynamic inner-closed loop power control algorithm is applied (ST12). Otherwise, the margin dynamic inner-closed loop power control algorithm is applied (ST13).

FIG. 16 shows the proposed uplink power control algorithm, in which an existing inner closed-loop is transformed in accordance with the state of a user. When a user receives a smaller amount of data than at a data rate requested by the user, data is transmitted with the maximum power of the user through the rate dynamic inner closed-loop power control algorithm. However, when the requested data rate is satisfied, the margin inner closed-loop power control algorithm is applied, thereby minimizing transmission power.

FIG. 17 is a flow chart showing a method for dynamic resource allocation of downlink in an OFDMA/TDD cellular system according to another embodiment of the invention.

First, a user is selected through the GPF algorithm (ST21). Then, dynamic channel allocation is performed through the ASA algorithm such that the FASA algorithm for obtaining a multiuser diversity gain is performed (ST22). Further, dynamic power allocation is performed through the improved CHC algorithm in consideration of a data rate provided to each user and a channel state (ST23).

FIG. 18 shows a detailed flow chart of the FASA using the GPF and ASA algorithms.

First, among sub-channels which are not allocated to other users, a sub-channel is searched for, which can guarantee the highest data rate to the selected user (ST31).

Then, data rates which the sub-channel can guarantee to other users are calculated (ST32).

After that, the calculated data rates are compared, so that a sub-channel with the smallest value is allocated to the selected user (ST33).

FIG. 19 shows the FASA algorithm which is a downlink dynamic channel allocation algorithm. The FASA algorithm makes up for weak points of other dynamic channel allocation algorithms including the existing GPF algorithm. The GPF algorithm is an algorithm which determines priorities between users, where sub-channels are to be allocated, considering momentary channel states of all users and an amount of data which has been received up to now. However, an arbitrary sub-channel among the overall sub-channels is allocated to the selected user. Equations 2 and 3 determine a PF metric of the GPF algorithm. Through Equations 2 and 3, the priorities between users are determined.

$$PF \text{ metric} = \frac{R_k(t)}{T_k(t)} \quad \text{[Equation 2]}$$

$$T_k(t) = \left(1 - \frac{1}{T_c}\right) T_k(t-1) + \frac{1}{T_c} R_k(t-1) \quad \text{[Equation 3]}$$

In Equation 2, $R_k(t)$ represents a data rate which can be momentarily obtained at a current time. In Equation 3, $T_k(t-1)$ represents a data rate which is provided till (t-2), and $R_k(t-1)$ represents a data rate which is provided at (t-1). That is, when a user has received a large amount of data up to now, the priority of the user decreases. However, if the momentary channel state of the user is significantly favorable, the priority of the user increases. Further, $T_c$ means an interval window of time as average. That is, when the channel state of the user is degraded, it takes at least about $T_c$ until the channel state is improved. Therefore, in the FASA algorithm, the user selection is performed by the GPF algorithm, and the process of allocating a sub-channel to a selected user is performed by the ASA algorithm. The ASA algorithm is divided in three stages.

In the first stage, among sub-channels which are not allocated to other users, sub-channels are searched for, which can guarantee the highest data rate to a selected user. At this time, since users transmit quantized channel information to a base station, a plurality of sub-channels, which guarantee the same channel gain to one user, may exist for the base station.

$$m^* = \underset{m=0:M-1}{\text{argmax}}(r_{k_{ASA}}, m) \quad \text{[Equation 4]}$$

Here, $r_{k_{ASA}, m}$ represents a data rate which can be guaranteed to a selected user $k_{ASA}$ at an $m^{th}$ sub-channel, and $m^*$ represents a sub-channel, which can guarantee the highest data rate to a user $k_{ASA}$, among the overall sub-channels. In this case, a plurality of sub-channels $m^*$ may exist.

In the second stage, data rates which the sub-channels $m^*$ can guarantee to another user are calculated.

$$R_{m^*} = \sum_{\substack{k=0 \\ k \neq k_{ASA}}}^{K-1} r_{k,m} = \sum_{\substack{k=0 \\ k \neq k_{ASA}}}^{K-1} \frac{q_{m^*}(k)}{T}, \quad \text{[Equation 5]}$$

Here, $R_{m^*}$ represents the sum of the data rates which can be guaranteed to all users, except for the selected user, at the sub-channel $m^*$.

In the third stage, the sums $R_{m^*}$ calculated by Equation 5 are compared with each other. A sub-channel, which provides the smallest data rate to another user among the searched sub-channels, is allocated to the selected user. That is, a sub-channel which can guarantee a relatively large data rate to another user remains, which makes it possible to the data rate of the entire system. However, in existing dynamic channel allocation algorithms, when a plurality of sub-channels which can be allocated to the selected user are present, a sub-channel with the earliest index is allocated to the selected user, without considering the status of other users.

FIG. 20 shows an allocation result through the FASA algorithm. In the system, it is assumed that the total number of users is four and the total number of sub-channels is eight. In FIG. 20, a horizontal axis indicates users, and a vertical axis indicates sub-channel numbers. Further, the value of each user for each sub-channel represents a channel gain, that is, a data rate which is guaranteed to the user. First, a user $k_1$ is selected by the GPF algorithm, and a sub-channel $m_4$ with the highest channel gain, among sub-channels of the user $k_1$, is allocated to the user $k_1$. Then, a user $k_2$ is selected, and a sub-channel $m_3$ is allocated to the user $k_2$. Further, a sub-channel $m_2$ is allocated to a user $k_3$, and a sub-channel $m_8$ is allocated to a user $k_4$.

After that, the user $k_3$ is again selected by the GPF algorithm, and sub-channels $m_5$ and $m_7$ among the sub-channels of the user $k_3$ guarantee the highest and same channel gain. Therefore, the base station should determine which of the sub-channels $m_5$ and $m_7$ is to be allocated to the user $k_3$. It can be found that between both of the sub-channels $m_5$ and $m_7$, the sub-channel $m_5$ can guarantee a larger channel gain to another user.

Therefore, as the base station allocates the sub-channel $m_7$ to the user $k_3$, it is possible to provide a chance that the sub-channel $m_5$ can be allocated to another user.

In the FASA algorithm, each user receives a sub-channel which can guarantee the highest channel gain to the user. Therefore, the FASA algorithm further enhances the performance and fairness of the entire system, compared with other algorithms.

FIG. 21 is a flow chart of the improved CHC algorithm which is a downlink dynamic power allocation algorithm.

In this algorithm, Phase I: User Grouping is performed (ST41), Phase II: Collection of Extra Power is performed (ST42), and Phase III: Re-Assignment of Extra Power is performed (ST43).

The basic concept of the improved CHC algorithm is as follows. The base station equally assigns the total power of 20 W to the users, to whom sub-channels are allocated, based on the concept of the EBP algorithm. Then, each of the users transmits to the station the average CINR of sub-channels allocated to the user, and the base station compares the average CINR of each user with nine target CINRs of MCS level, thereby determining the MCS level of the user. At this time, the base station performs 'Phase I: User Grouping' of FIG. 22. As a result, the users are classified into Groups 1 to 3.

Group 1 is a group of users whose data rate $R_{k_{MCS}}$, which can be provided on the basis of a current MCS level, is higher than a data rate $R_{k_{MCS}}$, requested by the users.

Group 2 is a group of users whose data rate $R_{k_{MCS}}$, which can be provided on the basis of a current MCS level, does not approach a data rate $R_{k_{req,min}}$ requested by the users.

Group 3 is a group of users whose CINR$_k$ does not even satisfy the target CINR$_{MCS0}$ of the lowest MCS level, the CINR$_k$ being the average CINR of sub-channels allocated to the users.

After the user grouping is completed, the base station performs 'Phase II: Collection of Extra Power' of FIG. 23. In Phase II of the improved CHC algorithm, extra power is collected from the users of Group 1. An important point is that, when extra power is collected from the users of Group 1, the collecting should be performed in such a manner that the data rates of the corresponding users are not reduced.

The final process of the improved CHC algorithm is 'Phase III: Re-Assignment of Extra Power' of FIG. 24. In this process, the collected extra power is re-assigned to the users of Group 2. At this time, the extra power is preferentially re-assigned to a user, who has the highest MCS level, among the users of Group 2.

When extra power is collected from a user, the extra power should be collected little by little for several stages such that the current MCS level of the corresponding user is not reduced. Further, even when the collected extra power is re-assigned, the extra power should be re-assigned little by little for several stages, in order to prevent unnecessary power consumption.

FIG. 25 shows a process of determining the magnitude of power for one stage when the collection of extra power and the re-assignment of extra power are performed. When the collection of extra power is performed, the magnitude of power for one stage is selected from 6.9 dBm, 10 dBm, and 13 dBm depending on a condition, considering that a CINR difference between MCS levels ranges from 2 to 3 dB. Further, when the re-assignment of extra power is performed, the magnitude of power for one stage is set to 3 dBm.

FIG. 26 shows a process of calculating a required amount of power according to the number of sub-channels allocated to a user. For example, if a user to whom one sub-channel is allocated requests a data rate of 256 kbps, an MCS level of 16QAM ½ should be applied to the user. However, if a user to whom three sub-channels are allocated requests a data rate of 256 kbps, the MCS level of QPSK ¼ may be applied to the user. That is, depending on the number of sub-channels allocated to a user, a requested MCS level can differ. Accordingly, an added amount of power should also differ.

FIG. 27 is a diagram showing the sector throughput of each algorithm when only the downlink dynamic channel allocation is performed. As seen from the result, the FASA algorithm exhibits the highest performance, in which the momentary channel states of all users are considered and sub-channels favorable to all users are allocated to the users. Further, an RCG algorithm, which theoretically exhibits the highest performance, exhibits very poor performance, because of a basic assumption of the BABS algorithm which is difficult to apply to an actual system.

FIG. 28 is a diagram showing the sector throughput of each algorithm after both of the downlink dynamic channel allocation and the downlink dynamic power allocation are performed. As seen from the result, when a combination of the FASA algorithm and the improved CHC algorithm is applied, the throughput thereof is the highest.

FIG. 29 is a diagram comparing fairness, when only the downlink dynamic channel allocation is performed, with fairness after the improved CHC algorithm proposed as the dynamic power assignment algorithm is applied. As seen from the result, after the proposed dynamic power assignment algorithm is applied, the sector throughput of most users exceeds a threshold, which means that the fairness is considerably enhanced.

FIG. 30 is a diagram comparing the fairness of the FASA algorithm, which is the proposed dynamic channel allocation algorithm, with the fairness of an existing Max CIR algorithm. In the Max CIR algorithm, all sub-channels are unconditionally allocated to a user whose channel state is good. Therefore, a throughput difference between users is very large. In the FASA algorithm proposed in the invention, however, a throughput difference between users is small.

FIG. 31 is a diagram showing a difference in channel information at the same sub-channel of uplink and downlink when interference from an adjacent cell exists. As shown in FIG. 31, when the interference from an adjacent cell exists, the uplink and downlink do not have perfect reciprocity. Therefore, when the uplink dynamic resource allocation is performed, using the channel information of the down link is not appropriate.

FIG. 32 is a graph showing the number of sub-channels to be allocated for each distance. In FIG. 32, under assumption that the uplink channel sounding is not used, an ITU-R M.1225 vehicular path loss model is applied to the existing FLR algorithm. Further, when 12 users are present in each cell, the number of sub-channels which can be allocated to each user for each distance is determined through a simulation. Briefly speaking, when only three sub-channels among the overall sub-channels are allocated to a user located within 100 m, the user has a received CINR of about −4.67 dB as average. When four sub-channels are allocated to the user, the user has a received CINR of about −6.14 dB as average. That is, in order to maintain a target CINR of −5.13 dB at which QPSK 1/12 requested by the user can be provided, more than four sub-channels must not be allocated. To apply the look-up table of FIG. 32 to users, the following conditions should be considered.

1) Case where the sum of sub-channels of all users exceeds the total number of sub-channels of the system 2) Case where the sum of sub-channels of all users is smaller than the total number of sub-channels of the system In the first case, it is important to preferentially determine the number of sub-channels ($N_{SHC}$) for a certain user. If $N_{SCH}$ is preferentially determined for a user located in the closest position from a base station, no sub-channel may be allocated to a user located in the edge of a cell. In this case, although the throughput of the system increases, the fairness between the overall users is not maintained. Therefore, in the first case, $N_{SCH}$ is preferentially determined for the user located in the edge of the cell, thereby maintaining the fairness at the maximum.

In the second case, when extra sub-channels remain after $N_{SCH}$ is determined for all users, whether or not to allocate the extra sub-channels to the users should be decided. If an additional sub-channel is allocated to a user whose $N_{SCH}$ has been already determined, power which is distributed to the sub-channels allocated to the corresponding user, respectively, is reduced, because the power is fixed. That is, as a larger number of sub-channels are used, the target CINR may be not satisfied.

Therefore, in the first case, $N_{SCH}$ is preferentially determined for a user located in the edge of a cell, and in the second case, $N_{SCH}$ is not additionally determined. After that, sub-channels corresponding to the number of sub-channels determined through the round-robin algorithm are allocated to each user.

Figure 33:
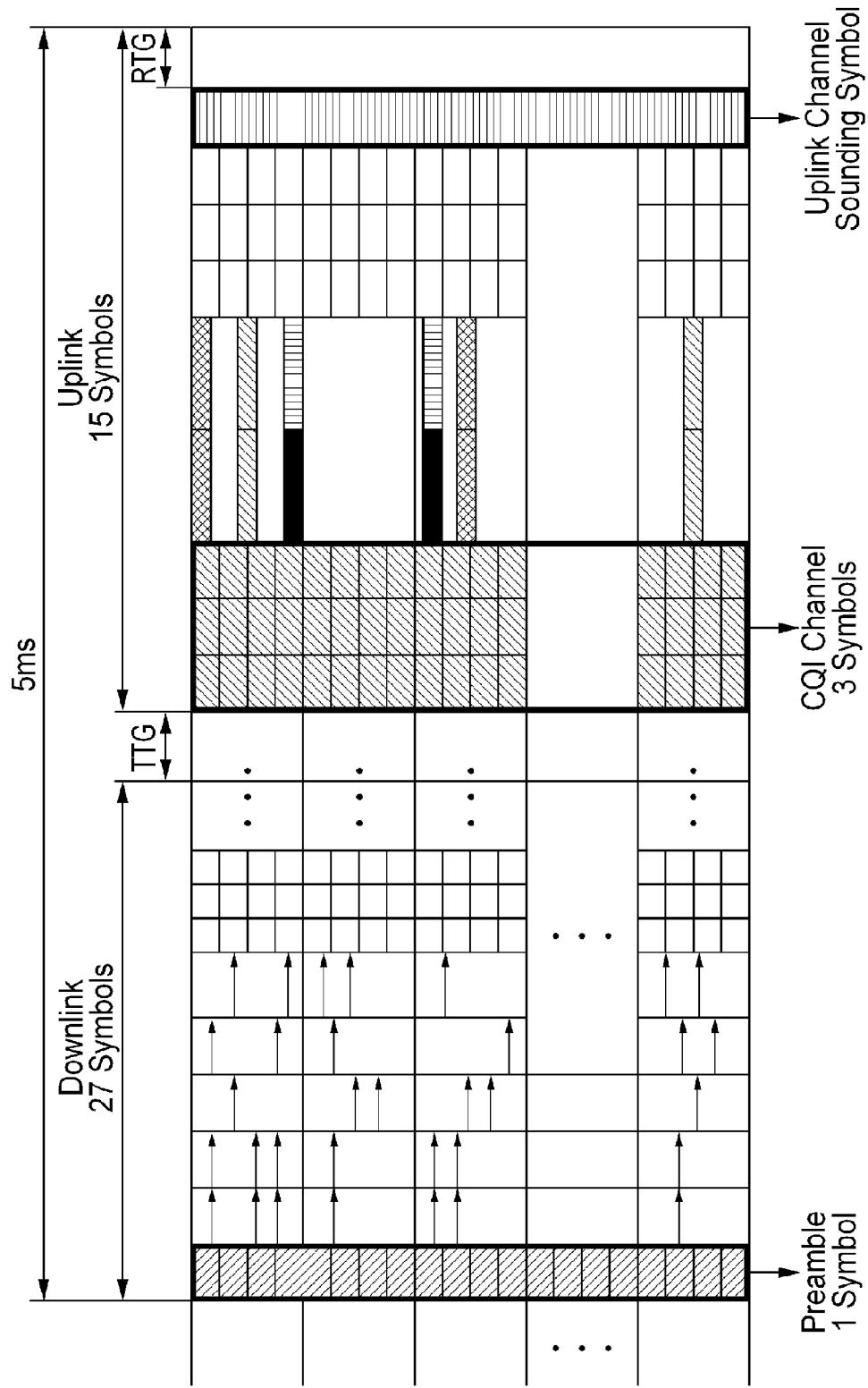
FIG. 33 is a diagram showing an OFDMA-TDD frame structure which supports downlink dynamic resource allocation using channel information through a preamble and uplink dynamic resource allocation using channel information through channel sounding.

FIG. 33 is a diagram showing a frame structure which supports downlink dynamic resource allocation using channel information through a preamble and uplink dynamic resource allocation using channel information through channel sounding.

FIG. 34 is a diagram comparing the fairness of a general round-robin algorithm with the fairness of a round-robin algorithm using the FLR algorithm and the rate adaptive/margin adaptive inner closed-loop power control algorithm. In FIG. 34, a general case is where 12 users respectively use two sub-channels. That is, the total number of used sub-channels is 24. In an FLR case, a different number of sub-channels are allocated to 12 users, respectively, in accordance with the look-up table of FIG. 32, and the rate adaptive or margin adaptive inner closed-loop power control is performed. When the FLR algorithm is applied, the fairness between the users is further enhanced than in the general round-robin algorithm, even though the enhancement of throughput is insignificant. That is, as the FLR algorithm is applied, only sub-channels corresponding to the number of sub-channels, which is suitable for the channel state of each user, are allocated to the user. Through this, the fairness of the system is enhanced.

FIG. 35 is a diagram for explaining a result where the uplink dynamic resource allocation is performed using uplink channel information obtained by uplink channel sounding. In FIG. 35, a result, in which dynamic channel allocation is performed through the round-robin algorithm after the number of sub-channels to be allocated to a user is determined by applying a lookup table through the FLR algorithm, is compared with the following two cases. In the first case, the GPF algorithm and the FASA algorithm are applied using downlink channel information. In the second case, the GPF algorithm and the FASA algorithm are applied using uplink channel information through the channel sounding. When the uplink channel information is used, the sector throughput of the GPF algorithm is enhanced by 16.3%, and the sector throughput of the FASA algorithm is enhanced by 22.7%, compared with the round-robin algorithm to which the FLR algorithm is applied. When the uplink channel information through the channel sounding is used, the sector throughput of the GPF algorithm is enhanced by 25.4%, and the throughput of FASA algorithm is enhanced by 31.8%, compared with the round-robin algorithm to which the FLR algorithm is applied. That is, as the dynamic channel allocation is performed using the accurate channel information, the performance is enhanced.

According to the method for dynamic resource allocation of uplink and downlink in an OFDMA/TDD cellular system, it is possible to propose the uplink and downlink dynamic resource allocation algorithm which can enhance the sector throughput and fairness of the 802.16e OFDMA/TDD cellular system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method for dynamic resource allocation of downlink in an OFDMA/TDD cellular system, the method comprising the steps of:
  selecting a user through a GPF algorithm;
  performing dynamic channel allocation through an ASA (Aggressive Sub-channel Allocation) algorithm so as to perform a FASA (Fairness insured Aggressive Sub-channel Allocation) algorithm for obtaining a multiuser diversity gain; and
  performing dynamic power allocation through an improved CHC (Chang, Heo and Cha) algorithm, in consideration of a data rate provided to each user and a channel state,
  wherein the performing of the dynamic channel allocation includes the steps of:
  searching for sub-channels which can guarantee the highest data rate to the selected user, among sub-channels which are not allocated to other users;
  calculating data rates which the sub-channels can guarantee to another user; and
  comparing the calculated data rates, and then allocating a sub-channel, which provides the smallest data rate to another user among the searched sub-channels, to the selected user,
  wherein in the calculating of the data rates, the data rates are calculated by using an equation:

$$R_{m^*} = \sum_{\substack{k=0 \\ k \neq k_{ASA}}}^{K-1} r_{k,m} = \sum_{\substack{k=0 \\ k \neq k_{ASA}}}^{K-1} \frac{q_{m^*}(k)}{T},$$

where $q_{m^*}$ represents a quantity of transmitted data through a sub-channel $m^*$, T represents a time interval and $R_{m^*}$ represents the sum of the data rates which can be guaranteed to all users, except for the selected user, at a sub-channel $m^*$.

2. The method according to claim 1, wherein in the searching for the sub-channels, the sub-channel is searched for by $$m^* = \underset{m=0:M-1}{\operatorname{argmax}}(r_{ASA}, m),$$

where $$r_{k_{ASA},m}$$

represents a data rate which can be guaranteed to a selected user $k_{ASA}$ at an $m^{th}$ sub-channel, and $m^*$ represents a sub-channel, which can guarantee the highest data rate to a user $k_{ASA}$, among the overall sub-channels.

3. The method according to claim 1, wherein the performing of the dynamic power allocation includes the steps of:

grouping users;

collecting extra power; and re-assigning the collected extra power.

4. The method according to claim 3, wherein in the grouping of the users, users who receive a larger amount of data than at a requested data rate are designated as a first group, users who receive a smaller amount of data than at a requested data rate are designated as a second group, and users who do not even satisfy a target CINR of the lowest MCS level because of a poor channel state are designated as a third group.

5. The method according to claim 3, wherein in the collecting of the extra power, the extra power is collected little by little for several stages such that the current MCS levels of users from whom power is collected decrease.

6. The method according to claim 3, wherein in the re-assigning of the collected extra power, the collected extra power is preferentially re-assigned to a user, who has the highest MCS level, among the corresponding users, and the power is re-assigned little by little for several stages such that unnecessary power consumption is prevented.

7. The method according to claim 3, wherein in the re-assigning of the collected extra power, the re-assigning is determined in accordance with the number of sub-channels allocated to the user and is then re-assigned to the user.

* * * * *